(12) United States Patent
Zampiello et al.

(10) Patent No.: US 8,812,347 B2
(45) Date of Patent: Aug. 19, 2014

(54) AGGREGATING AND CAPTURING SUBSCRIBER TRAFFIC

(75) Inventors: Geoffrey Richard Zampiello, Norwalk, CT (US); Scott Sheppard, Decatur, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1035 days.

(21) Appl. No.: 12/469,909

(22) Filed: May 21, 2009

(65) Prior Publication Data

US 2010/0299173 A1    Nov. 25, 2010

(51) Int. Cl.
*G06Q 30/02* (2012.01)
*H04L 29/08* (2006.01)
*H04W 28/06* (2009.01)
*H04W 8/26* (2009.01)

(52) U.S. Cl.
CPC ........... *H04W 28/06* (2013.01); *G06Q 30/0246* (2013.01); *H04W 8/26* (2013.01); *H04L 67/22* (2013.01)
USPC ........................................................ 705/7.34

(58) Field of Classification Search
USPC .............................................................. 726/4
See application file for complete search history.

(56) References Cited

U.S. PATENT DOCUMENTS

2009/0138945 A1 * 5/2009 Savchuk ........................... 726/4

* cited by examiner

*Primary Examiner* — Shay S Glass
(74) *Attorney, Agent, or Firm* — Amin, Turocy & Watson, LLP

(57) ABSTRACT

System(s), method(s), and device(s) that can aggregate all or substantially all data traffic, such as wireless data traffic egressing to the Internet, at one or more regional aggregation hubs and capture a portion(s) of data traffic associated with a subscriber(s) of interest at the regional hub(s) are presented. Data traffic associated with subscribers can be aggregated at an access concentrator(s) and respective public Internet Protocol (IP) addresses can be given to respective subscribers. The data traffic can be aggregated at the regional hub(s) and data traffic associated with a subscriber(s) of interest can be identified based at least in part on the public IP address(es) of the respective subscriber(s) of interest. The data traffic associated with a subscriber(s) of interest can be captured and provided to a consumer (e.g., law enforcement, service provider) who desires such data.

13 Claims, 16 Drawing Sheets

AGGREGATING AND CAPTURING SUBSCRIBER TRAFFIC

TECHNICAL FIELD

The subject innovation generally relates to data communications, and, more particularly, to aggregating and capturing subscriber traffic.

BACKGROUND

Conventionally, in a communication network (e.g., wireless communication network), data traffic can be routed or distributed widely in the network. For instance, there can be many egress points for data traffic, such as egress points associated with a hotspot (e.g., Wi-Fi hotspot) or egress points associated with digital subscriber lines (DSLs), which can result in wide distribution of the traffic. This can make it very difficult to track various subscribers communicating in the network and capture traffic associated with a particular subscriber when desired. For example, law enforcement may make a lawful request to have a service provider track and capture data traffic associated with a subscriber of interest (e.g., suspect). However, the wide distribution of data traffic from the many different egress points can make it very difficult, if not impossible, to identify the subscriber of interest and associated data traffic in order to capture the traffic associated with the subscriber of interest.

It is desirable to be able to track subscribers communicating in the communication network when desired and capture data traffic associated with subscribers of interest. It is also desirable to track and capture data traffic associated with subscribers of interest in an efficient manner.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s), method(s), and device(s) that can aggregate all or substantially all data traffic, such as wireless data traffic egressing to a destination (e.g., Internet, server, . . . ), at a specified number (e.g., one or more) regional aggregation hubs and can capture a portion(s) of the data traffic associated with a subscriber(s) of interest to a consumer (e.g., law enforcement agency, advertising agency, marketing agency, service technician, . . . ) at the regional hub(s) (e.g., L2TP network server) are presented. Data traffic from communication devices (e.g., mobile phone, computer, . . . ) respectively associated with subscribers can be communicated via respective access points (APs) (e.g., Wi-Fi hotspot, base station, femtocell, picocell, Wi-Max AP, AP associated with Edge network, . . . ) to an access concentrator(s) (e.g., L2TP access concentrator). The data traffic can be aggregated at the access concentrator(s), and the access concentrator(s) can assign respective public Internet Protocol (IP) addresses to respective subscribers to facilitate identifying data traffic associated with a subscriber of interest to the consumer. For example, a subscriber of interest to a consumer can be assigned a public IP address that is different from a public IP address assigned to a subscriber not of interest to a consumer to facilitate distinguishing between a subscriber of interest and a subscriber not of interest to a consumer. The data traffic can be aggregated at the regional hub(s) (e.g., regional aggregation components, regional aggregation points).

In another aspect, a capture component can be associated with one or more of the regional hubs and can be employed to analyze the public IP addresses and associated data traffic in accordance with a policy (e.g., a virtual-local-area-network access control list (VACL)) that can comprise predefined data capture criteria. The capture component can identify and capture data traffic associated with a subscriber(s) of interest to a consumer(s) (e.g., data traffic to or from the communication device(s) of the subscriber(s) of interest) based at least in part on the policy and the public IP address associated with the subscriber(s) of interest. The data traffic associated with a subscriber(s) of interest can be stored, for example, in a mediator component, and, at a desired time, provided to a consumer (e.g., law enforcement advertising agency, . . . ) that desires such data.

In accordance with various other aspects and embodiments, methods that can aggregate data traffic associated with subscribers and capture data traffic associated with a subscriber(s) of interest to a consumer are presented; and devices that can facilitate aggregating data traffic associated with subscribers and capturing data traffic associated with a subscriber(s) of interest to a consumer are presented.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
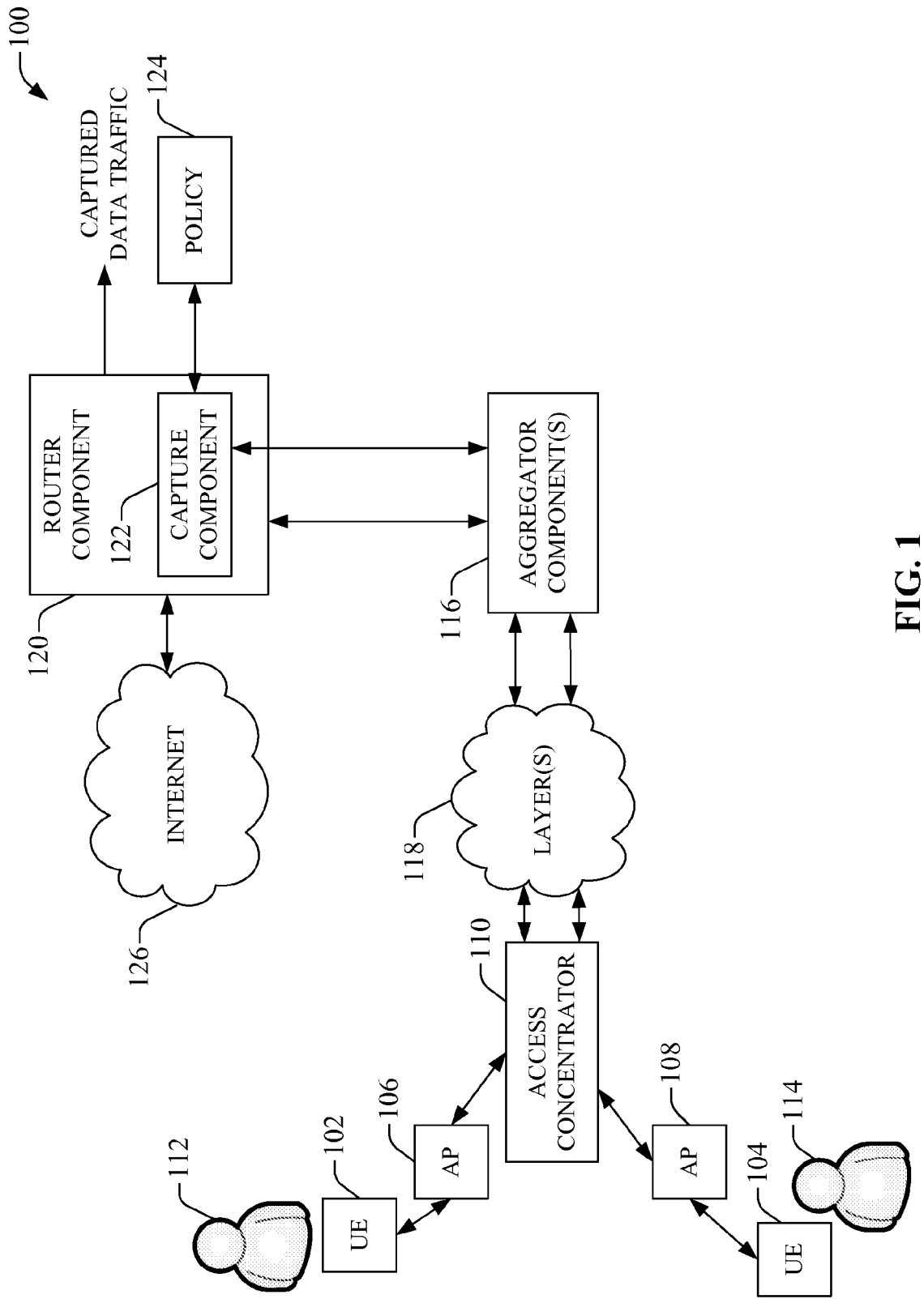
FIG. 1 is a block diagram of an example system that can identify and capture data traffic associated with a subscriber of interest in a communication network in accordance with various embodiments of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. The term "access point" can refer to a hot spot, base station (also known as "Node B," "evolved Node B," and the like), femtocell, picocell, access point employing Wi-Max, access point associated with Edge network, etc., and refers to a wireless network component or appliance that serves and receives data, control, voice, video, sound, gaming, or substantially any data-stream or signaling-stream from a set of subscriber stations. Data and signaling streams can be packetized or frame-based flows, for example. Furthermore, the terms "user," "subscriber," "customer," and the like are employed interchangeably throughout the subject specification, unless context warrants particular distinction(s) among the terms.

Referring to the figures, FIG. 1 is a block diagram of an example system 100 that can identify and capture data traffic associated with a subscriber of interest in a communication network in accordance with various embodiments of the disclosed subject matter. In an aspect, example system 100 can include a plurality of UEs (e.g., mobile communication device, such as a mobile phone (e.g., Third Generation Partnership Project (3GPP) Universal Mobile Telecommunications System (UMTS) phone); personal digital assistant (PDA); computer; IP television (IPTV); set-top box; gaming console; wireless printer; etc.), such as UE 102 and UE 104, in a communication environment (e.g., a wireless communication network). The UEs 102 and 104 can be connected (e.g., wirelessly connected) to respective access points (AP) 106 and 108 (e.g., AP associated with a hotspot, such as a Wi-Fi hotspot; base station; femtocell; picocell; Wi-Max AP; AP associated with an Edge network; etc.) to facilitate communication in the wireless communication environment. Each of AP 106 and 108 can serve and cover respective specified areas, and each of AP 106 and 108 can service wireless communication devices, such as UE 102 and UE 104, respectively, in located in the coverage areas respectively associated with the APs 106 and 108, where such coverage can be achieved via a wireless link (e.g., uplink (UL), downlink (DL)). When an attachment attempt is successful, UE (e.g., 102, 104) can be served by the serving AP (e.g., 106, 108) and incoming voice and data traffic can be paged and routed to the UE through the serving AP, and outgoing voice and data traffic from the UE can be paged and routed through the serving AP to other communication devices associated with the communication environment.

In an aspect, each of the APs 106 and 108 can be associated with an access concentrator 110 that can facilitate aggregating data traffic associated with the UEs 102 and 104. In an embodiment, the access concentrator 110 can be an L2TP access concentrator (LAC). The respective data traffic associated with the UEs 102 and 104 can be received by the respective APs 106 and 108 and communicated to the access concentrator 110. In another aspect, each of the UEs 102 and 104 can be respectively associated with subscribers 110 and 112, and the access concentrator 110 can assign a public IP address to each subscriber and associated UE to facilitate identification of the data traffic associated with a desired subscriber (e.g., subscriber of interest) and capture of all or a portion of the data traffic associated with the desired subscriber, where the captured traffic can be provided to a consumer (e.g., law enforcement agency, service provider or technician, marketing agency, etc.) who desires the captured data traffic (e.g., for further processing). For instance, a subscriber that is not of interest to a consumer, such as subscriber 112, can be assigned a public IP address that can indicate that the subscriber is not of interest to a consumer, and a subscriber that is of interest to a consumer, such as subscriber 114, can be assigned a public IP address that can indicate that the subscriber is of interest to a consumer. In an aspect, the respective subscribers can be identified and respective public IP addresses assigned based at least in part on respective user information of the subscribers, where, for example, the user information can be stored in respective user records, such as Remote Authentication Dial In User Service (RADIUS) records. The user information can comprise access or authentication credentials (e.g., username, password, biometric information, etc.), user's name, location of the user, historical IP addresses, etc. For example, when a subscriber (e.g., 114) attempts to access information online, the user information associated with the subscriber can be retrieved from a data store and the subscriber can be identified and a determination made as to whether the subscriber is of interest or is not of interest to a consumer. There can be one or more public IP addresses employed that can be assigned to subscribers that are not of interest to a consumer, and one or more public IP addresses employed that can be assigned to subscribers that are of interest to a consumer(s).

In another aspect, the access concentrator 110 can be associated with an aggregator component(s) 116 where a tunnel(s) can be established to facilitate communication of data between the access concentrator 110 and the aggregator component 116 in accordance with specified protocols. In accordance with an embodiment, the aggregator component 116 can be a network server, such as an L2TP network server (LNS).

In still another aspect, a layer(s) 118, comprising one or more layers (e.g., network layer, transport layer, . . . ) can be employed to facilitate data communication, where, for example, a network layer can facilitate providing network addressing, switching, routing, error handling, packet sequencing, etc., and a transport layer that can facilitate segmenting data into packets for transport across the network and ensuring data transfer by providing flow control, multiplexing, error detection and correction, etc. The layer(s) 118 can be agnostic with regard to the Internet Service Provider(s) (ISP(s)).

The respective data traffic associated with the respective UEs 102 and 104 (and respective subscribers 112 and 114), as well as data traffic associated with other subscribers, can be aggregated at the aggregator component 116, such that all or substantially all wireless data traffic associated with the communication network can be aggregated at the aggregator component(s) 116. It is to be appreciated and understood that, while one aggregator component 116 is depicted in FIG. 1, in accordance with various embodiments, there can be one or more aggregator components 116 (e.g., 1, 2, 3, . . . , 10, 20, 30, . . . , 50, or more) employed in system 100, where the respective aggregator components 116 can be regional hubs that can aggregate respective portions of the data traffic associated with the subscribers so that all or substantially all of the data traffic (e.g., Wi-Fi data traffic, cellular data traffic, or other wireless data traffic) can be aggregated at the aggregator components 116 to facilitate identification and capture of desired data traffic associated with a desired subscriber based at least in part on the public IP address associated with the desired subscriber.

In yet another aspect, the aggregator component 116 can be associated with (e.g., connected to) a router component 120 that can facilitate routing data traffic in the communication network. In an embodiment, the router component 120 can comprise a capture component 122 that can capture data traffic associated with a desired subscriber(s) (e.g., subscriber(s) of interest) based at least in part on a public IP address(es) respectively associated with the desired subscriber(s) and a policy 124, which can be received by the router component 120. For instance, the router component 120 can receive and store a policy(ies) 124 associated with a consumer(s) who desires data associated with subscribers of interest to the consumer(s). The policy 124 can include information relating to subscribers (e.g., access or authentication credentials or other information that can facilitate identifying a subscriber), such as a subscriber(s) of interest, period of time over which the data is to be captured, type(s) of data to be captured, etc., to facilitate filtering data traffic (e.g., capturing data traffic associated with a subscriber(s) of interest). In an embodiment, the policy 124 can be, can comprise, or can be associated with a virtual-local-area-network access control list (VACL) that can contain information that can facilitate filtering data traffic, moving data traffic, identifying subscribers of interest, and capturing data traffic associated with the subscriber(s) of interest, based at least in part on respective public IP addresses of subscribers.

The capture component 122 can monitor data traffic aggregated at and being processed through the aggregator component 116, and can utilize information, such as a public IP address, associated with a subscriber of interest to facilitate analyzing data traffic and identifying data traffic associated with the subscriber of interest. When the capture component 122 identifies data traffic associated with the subscriber of interest, the capture component 122 can capture the data traffic associated with the subscriber of interest, where the captured data traffic can be copied and a copy of the data traffic can be provided to a desired consumer the data traffic also can be forwarded to its original destination (e.g., Internet 126, or another destination, such as a particular server), or the captured data traffic can be captured and provided to the consumer such that the data traffic does not get forwarded to its original destination, as desired. In another aspect, the router component 120 can communicate data traffic associated with the subscribers to the Internet 126 (or another desired destination, such as a server) and desired communication devices (not shown) associated with the Internet 126 (e.g., destination points) to facilitate communicating data between communication devices in the communication network. The captured data traffic associated with the subscriber of interest can be provided, for example, as an output. The output data traffic can be provided directly to a consumer who desires or requested such data traffic or can be stored (e.g., in a mediator component) until provided to the consumer.

The subject innovation can thereby route and aggregate all or substantially all data traffic through regional aggregator components, such as aggregator component 116, to facilitate analyzing the data traffic and respective public IP addresses to identify and capture data traffic associated with a subscriber of interest to a consumer, while also enabling the data traffic to egress to a desired destination (e.g., the Internet and other communication devices associated therewith). Since data traffic can be aggregated and analyzed, and desired data traffic captured at a regional aggregation point, the underlying technology (e.g., Broadband Remote Access Server (BRAS), Managed Internet Service (MIS), . . . ) utilized by an AP (e.g., 106, 108) is of no concern, because, by aggregating the data traffic, the data traffic can be accessible to the capture component 122. As a result, the subject innovation can provide an efficient way to analyze data traffic and capture desired data traffic associated with subscriber(s) of interest to a consumer, as compared to conventional systems and methods, where data traffic is not being aggregated, and as a result, data capture would have to occur at many different places in the conventional communication network and every router would have to have intercept capabilities (e.g., lawful intercept (LI) capabilities). Further, conventionally, there would be instances in which an ISP would not have access to subscriber data traffic, such as, for example, when an AP had Internet access provided by another ISP. In accordance with the subject innovation, the regional aggregation of data traffic enables the ISP to maintain the subscriber on the network associated with the ISP, thereby enabling the ISP to use the capture component to capture data traffic associated with a subscriber of interest to a consumer, as desired.

The subject innovation can be employed in a variety of instances. For example, the consumer can be a law enforcement agency that is making a request (e.g., a lawful request) to an ISP to have data traffic associated with a subscriber of interest (e.g., suspected criminal) captured and provided to the law enforcement agency (e.g., pursuant to Communications Assistance for Law Enforcement Act (CALEA)). As another example, a data collector (e.g., a marketing agency, advertising agency, . . . ) can desire information regarding subscribers associated with the communication network and thus can desire that the ISP employ the subject innovation to capture of data traffic associated with the subscribers of interest to the data collector, where the captured data traffic can be utilized for various purposes, such as developing demographics and demographic relationships of subscribers, targeting advertisements to subscribers, etc. As still another example, a subscriber can be having service issues with communication (e.g., wireless communication) in the network. A service technician can employ the subject innovation to facilitate capturing data traffic associated with the subscriber, where the captured data traffic can be used to facilitate determining or isolating the service issues of the subscriber so the service issues can be rectified. In an aspect, the consumer (e.g., law enforcement agency, data collector, service technician, . . . ) can employ deep packet inspection (DPI) or other inspection on captured data traffic to analyze the header information and payload of the captured data traffic to obtain information regarding the captured data traffic and associated subscriber of interest.

In accordance with various embodiments, the policy 124 can specify that only certain portions of data traffic associated with a subscriber of interest are desired by a consumer. In an aspect, the subject innovation can capture data traffic associated with the subscriber of interest and can filter the captured data traffic to yield the desired certain portions of data traffic in accordance with the policy 124, or alternatively, can capture only the desired certain portions of data traffic. For example, a processor can be employed to analyze the captured data traffic and filter captured data traffic (e.g., perform keyword search on captured data traffic) to obtain the desired certain portions of data traffic associated with a subscriber of interest, and the desired certain portions of data traffic can be provided to the consumer.

It is to be appreciated and understood that, while the subject innovation has been described as being utilized with wireless communication (e.g., Wi-Fi hotpot, base station, femtocell, picocell, . . . ), the subject innovation is not so limited, as, in accordance with various embodiments, the subject innovation also can be employed in a wired communication network (e.g., wired Local Area Network (LAN)), or a combination thereof. It also is to be appreciated and understood that the subject innovation is depicted in FIG. 1 as having two UEs 102 and 104, two APs 106 and 108, one access concentrator 110, two subscribers 112 and 114, one aggregator component 116, one router component 120, one capture component 122, and one policy 124; however, the subject innovation is not so limited, as there can be virtually any desired number of the respective components, as there can be one or more UEs, one or more APs 106, one or more access concentrators 110, one or more aggregator components 112, one or more router components 120, one or more capture components 122, and one or more policies 124, as desired. It is to be further appreciated and understood that, while the capture component 122 is depicted as being contained within the router component 120, the subject innovation is not so limited, as, in accordance with various embodiments, the capture component 122 can be a stand-alone unit, or all or a portion (e.g., component(s)) of the capture component 122 can be part of another component (e.g., aggregator component 116) of system 100, as desired.

FIGS. 2-8 depicts various example embodiments that can identify and capture data traffic associated with a subscriber(s) of interest in a communication network. It is to be appreciated and understood that the various embodiments disclosed herein are example embodiments, and other embodiments are contemplated in accordance with the subject innovation, and all such other embodiments are intended to and are within the scope of the subject innovation disclosed herein.

Figure 2:
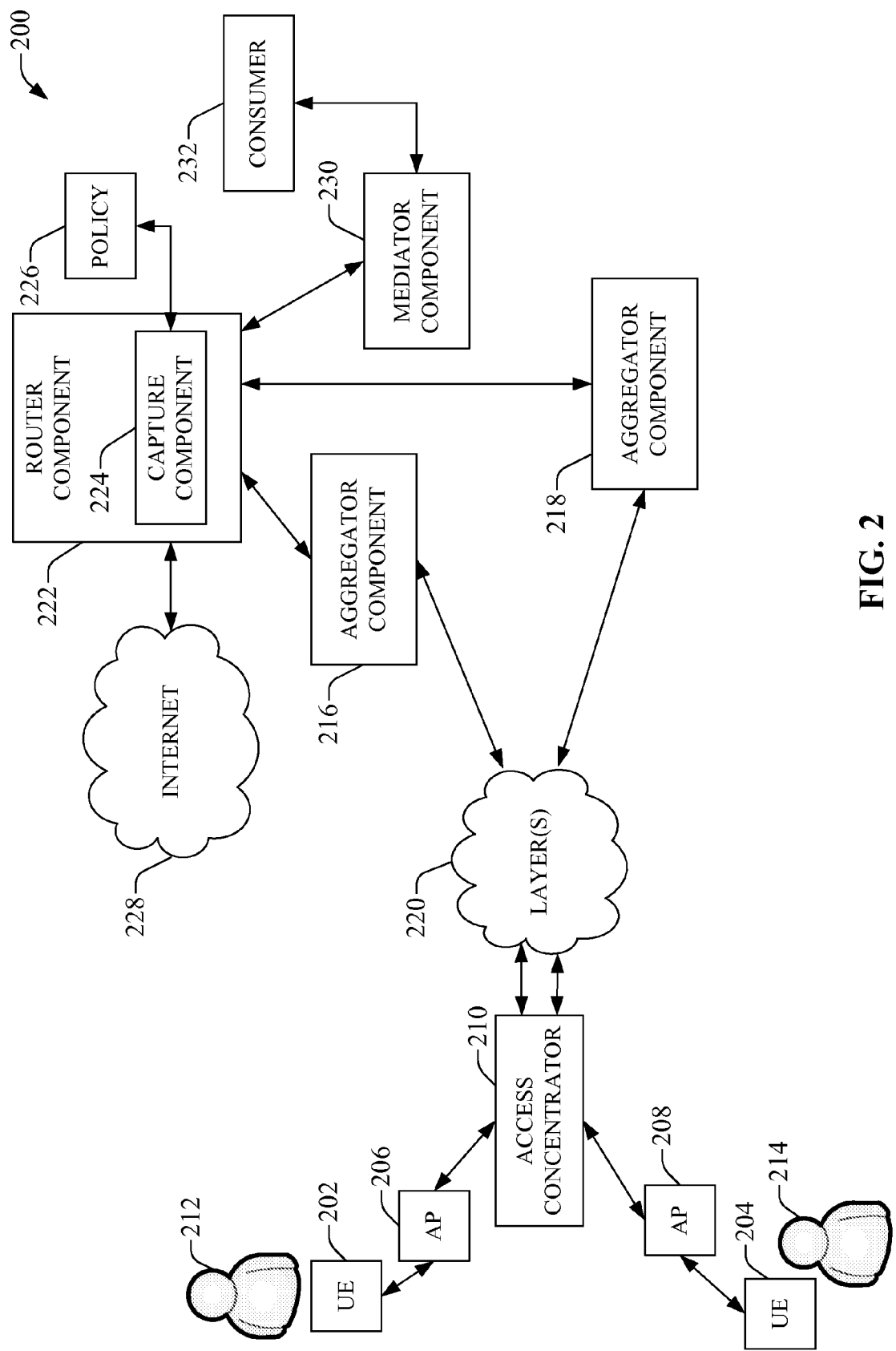
FIG. 2 is a block diagram of an example system that can identify and capture data traffic associated with a subscriber of interest in a communication network in accordance with an embodiment of the disclosed subject matter.

FIG. 2 illustrates a block diagram of an example system 200 that can identify and capture data traffic associated with a subscriber of interest in a communication network in accordance with an embodiment of the disclosed subject matter. The system 200 can comprise UE 202 and 204, AP 206 and AP 208, access concentrator 210, subscribers 212 and 214 respectively associated with (e.g., utilizing) the UEs 202 and 204, aggregator components 216 and 218, layer(s) 220, router component 222, capture component 224, policy 226, and Internet 228, wherein such components of the system 200 can comprise the same or similar functionality or features of respectively named components, such as more fully described herein, for example, with regard to the system 100. The UEs 202 and 204 can be respectively associated with (e.g., connected to) APs 206 and 208, which can be associated with the access concentrator 210. The access concentrator 210 can be associated with the aggregator components 216 and 218, where the layer(s) 220 (e.g., network layer and/or transport layer) can be employed to facilitate communication of data between the access concentrator 210 and respective aggregator components 216 and 218. The aggregator components 216 and 218 can be associated with the router component 222, which can include a capture component 224 and can be associated with the policy 226 and Internet 228.

In accordance with an embodiment, the APs 206 and 208 can be a hotspot (e.g., Wi-Fi hotspot) or other type of AP, such as a base station, femtocell, picocell, etc., that can facilitate wireless communication by wireless communication devices (e.g., UEs 202 and 204) in a wireless communication environment. The access concentrator 210 can receive and aggregate data traffic respectively associated with each of the UEs 202 and 204, and associated subscribers 212 and 214. The access concentrator 210 can be or can comprise an LAC, for example. In an aspect, the subscriber 214 can be a subscriber of interest (e.g., subscriber who is of interest to law enforcement; subscriber who is of interest to a service provider; subscriber who is of interest in relation to marketing or demographic activities; etc.) and subscriber 212 can be an entity for which there is no particular interest by a consumer (e.g., law enforcement, service provider, market or demographic research entity, etc.). A tunnel (e.g., communication tunnel) can be established between the access concentrator 210 and the aggregator component 216 and another tunnel can be established between the access concentrator 210 and the aggregator component 218. In an embodiment, the aggregator components 216 and 218 each can be or can comprise a network server, such as an LNS. The access concentrator 210 can assign or associate a specified public IP address to/with the subscriber 212 and associated UE 202, where the specified public IP address can be identified as a public IP address associated with a subscriber (e.g., 212) for which there is no particular interest with regard to data traffic capture. The access concentrator 210 can assign or associate a different public IP address to/with subscriber 210 and associated UE 204, where the different public IP address can be identified as a public IP address associated with a subscriber (e.g., 214) for which there is an interest with regard to data traffic capture. The respective public IP addresses can be assigned to the respective subscribers based at least in part on user information (e.g., attribute(s) in RADIUS records) respectively associated with the subscribers.

In an aspect, the data traffic associated with subscriber 212 (and other subscribers for which there is no particular interest in data traffic capture) can be communicated to and aggregated by the aggregator component 216 via the tunnel between the access concentrator 210 and aggregator component 216, and data traffic associated with subscriber 210 (and data traffic of other subscribers of interest to a consumer(s)) can be communicated to and aggregated by aggregator component 218 via the tunnel between the access concentrator 210 and aggregator component 218. The capture component 224 can monitor data traffic respectively associated with the subscribers (e.g., data traffic communicated to or from a communication device associated with a subscriber) and respectively associated public IP addresses to facilitate identifying data traffic associated with a subscriber(s) of interest (e.g., 214). The capture component 224 can analyze the data traffic and associated public IP addresses, and can utilize the policy 226 to facilitate determining which data traffic to capture or intercept, and can capture data traffic associated with a subscriber(s) of interest 214, based at least in part on the public IP address associated with the subscriber(s) of interest 214 and the policy 226 (e.g., VACL). The router component 222 can facilitate routing or communicating data traffic, such as data traffic respectively associated with subscribers 212 and 214, to/from the Internet 228.

In an aspect, the capture component 224 can provide the captured data traffic (e.g., mined data traffic) to a mediator component 230, which can store the captured data traffic of respective subscribers of interest (e.g., 214). Captured data traffic of each subscriber of interest 214 can be provided by the mediator component 230 to a consumer(s) 232, where the consumer(s) 232 can utilize the data for desired purposes (e.g., store the captured data traffic, analyze or further process the captured data traffic, etc.).

Figure 3:
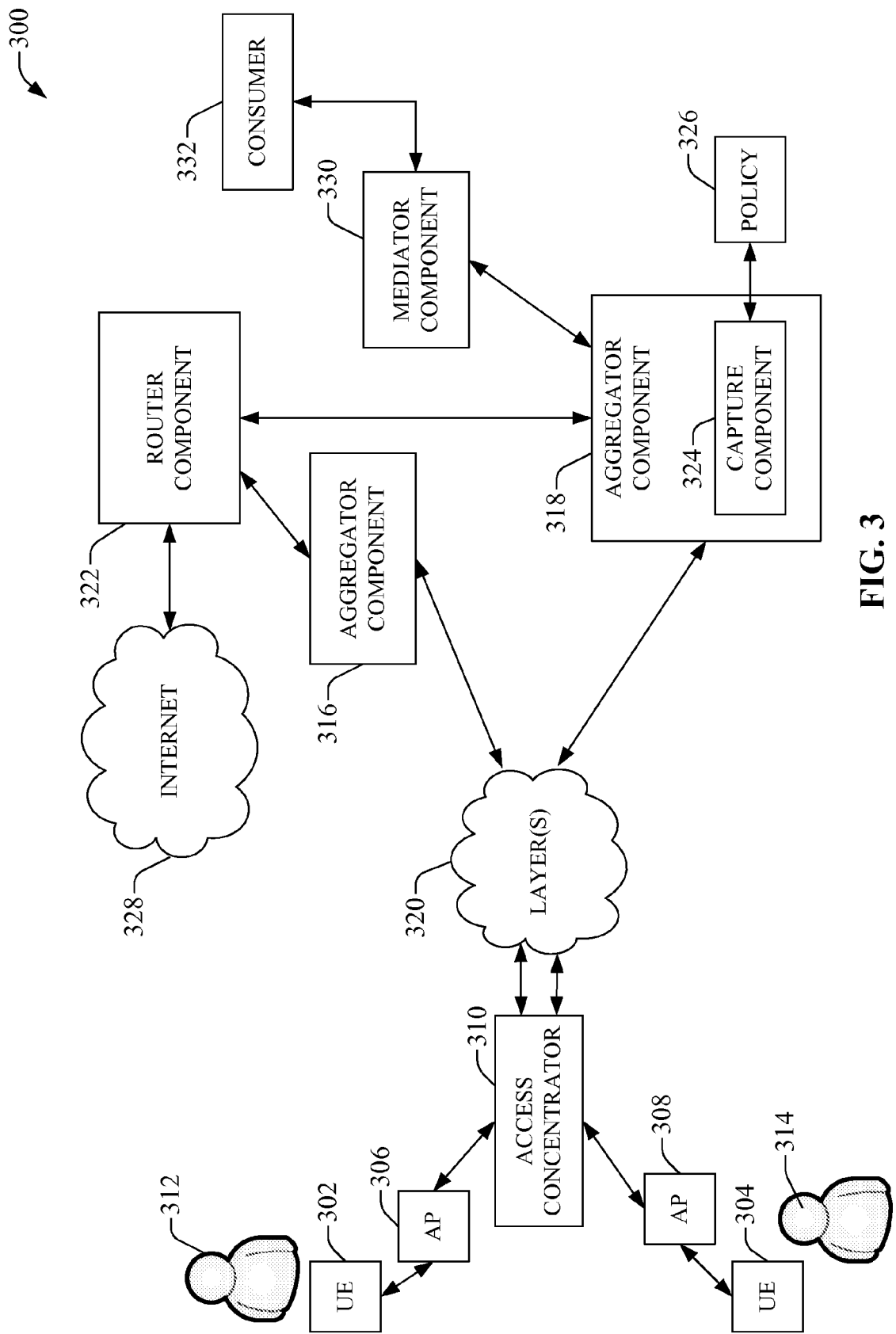
FIG. 3 depicts a block diagram of an example system that can employ an aggregator component that can identify and capture data traffic associated with a subscriber of interest in a communication network in accordance with another embodiment of the disclosed subject matter.

FIG. 3 illustrates a block diagram of an example system 300 that can utilize an aggregator component that can identify and capture data traffic associated with a subscriber of interest in a communication network in accordance with another embodiment of the disclosed subject matter. The system 300 can comprise UE 302 and 304, AP 306 and AP 308, access concentrator 310, subscribers 312 and 314 respectively associated with (e.g., utilizing) the UEs 302 and 304, aggregator components 316 and 318, layer(s) 320, router component 322, capture component 324, policy 326, Internet 328, mediator component 330, and consumer(s) 332, wherein such components of the system 300 can comprise the same or similar functionality or features (or at least a desired portion of the functionality or features) of respectively named components, such as more fully described herein, for example, with regard to the system 100 and system 200. In accordance with an aspect, the aggregator component 318 can comprise the capture component 324, which can capture or intercept data traffic associated with a subscriber(s) of interest (e.g., to a consumer 332), such as subscriber 314, and the associated UE (e.g., UE 304), and the captured data traffic can be provided to the mediator component 330 to facilitate providing the captured data traffic to a desired consumer 332.

In one aspect, the UEs 302 and 304 can be associated with (e.g., connected to) respective APs 306 and 308, which each can be associated with the access concentrator 310. The access concentrator 310 can be associated with the aggregator components 316 and 318, where the layer(s) 320 can be employed to facilitate communication of data between the access concentrator 310 and the respective aggregator components 316 and 318. The aggregator component 316 can be associated with the router component 322 to facilitate routing data traffic associated with subscribers for which there is no interest by a consumer (e.g., subscriber 312) to or from the Internet 328. The aggregator component 318 can comprise the capture component 324, and can be associated with the policy 326 and mediator component 330. The mediator component 330 can be associated with a consumer(s) 332.

In accordance with an embodiment, the APs 306 and 308 each can be a hotspot (e.g., Wi-Fi hotspot) or other type of AP, such as a base station, femtocell, picocell, etc., that can facilitate wireless communication of data by the UEs (e.g., 302, 304) associated therewith. The access concentrator 310 can receive and aggregate data traffic associated with one or more subscribers (e.g., 312, 314) associated with the APs 306 and 308. The access concentrator 310 can be or can comprise an LAC, for example. In an aspect, the subscriber 314 can be a subscriber of interest to a consumer 332 and subscriber 312 can be an entity for which there is no particular interest by a consumer 332. A tunnel (e.g., communication tunnel) can be established between the access concentrator 310 and the aggregator component 316, and another tunnel can be established between the access concentrator 310 and the aggregator component 318. In an embodiment, the aggregator components 316 and 318 each can be or can comprise a network server, such as an LNS. The access concentrator 310 can assign a specified public IP address to subscriber 312 and associated UE 302, where the specified public IP address can be identified as a public IP address associated with a subscriber (e.g., 312) for which there is no particular interest with regard to data traffic capture. The access concentrator 310 can assign a different public IP address to subscriber 314 and associated UE 304, where the different public IP address can be identified as a public IP address associated with a subscriber (e.g., 314) for which there is an interest with regard to data traffic capture. In an aspect, the respective public IP addresses can be assigned to the respective subscribers based at least in part on user information (e.g., attribute(s) in RADIUS records) respectively associated with the subscribers, where the user information can be stored in a data store, for example.

In an aspect, the data traffic associated with subscriber 312 (and other subscribers for which there is no particular interest in data traffic capture) can be communicated to and aggregated by the aggregator component 316 via the tunnel between the access concentrator 310 and the aggregator component 316, and data traffic associated with subscriber 314 (and other subscribers of interest) can be communicated to the aggregator component 318 via the tunnel between the access concentrator 310 and aggregator component 318, and aggregated by aggregator component 318. The capture component 324, in aggregator component 318, can monitor data traffic respectively associated with the subscribers (e.g., data traffic communicated to or from a communication device of a subscriber) and respectively associated public IP addresses to facilitate identifying data traffic associated with a subscriber(s) of interest (e.g., 314). The capture component 324 can analyze the data traffic and can utilize the policy 326 (e.g., VACL) to facilitate determining which data traffic to capture or intercept, and can capture data traffic associated with a subscriber(s) of interest 314, based at least in part on the public IP address of the subscriber(s) of interest 314 and the policy 326. In another aspect, the router component 322 can facilitate communicating data traffic, such as data traffic respectively associated with subscribers 312 and 314, to/from the Internet 328 from/to the respective UEs 302 and 304.

In still another aspect, the capture component 324 can provide the captured data traffic (e.g., mined data traffic) to a mediator component 330, which can store the captured data traffic of respective subscriber(s) of interest (e.g., 314). The captured data traffic of a subscriber of interest 314 can be provided to a consumer 332, where the consumer 332 can utilize the data for desired purposes (e.g., store the captured data traffic, analyze or further process the captured data traffic, etc.).

Figure 4:
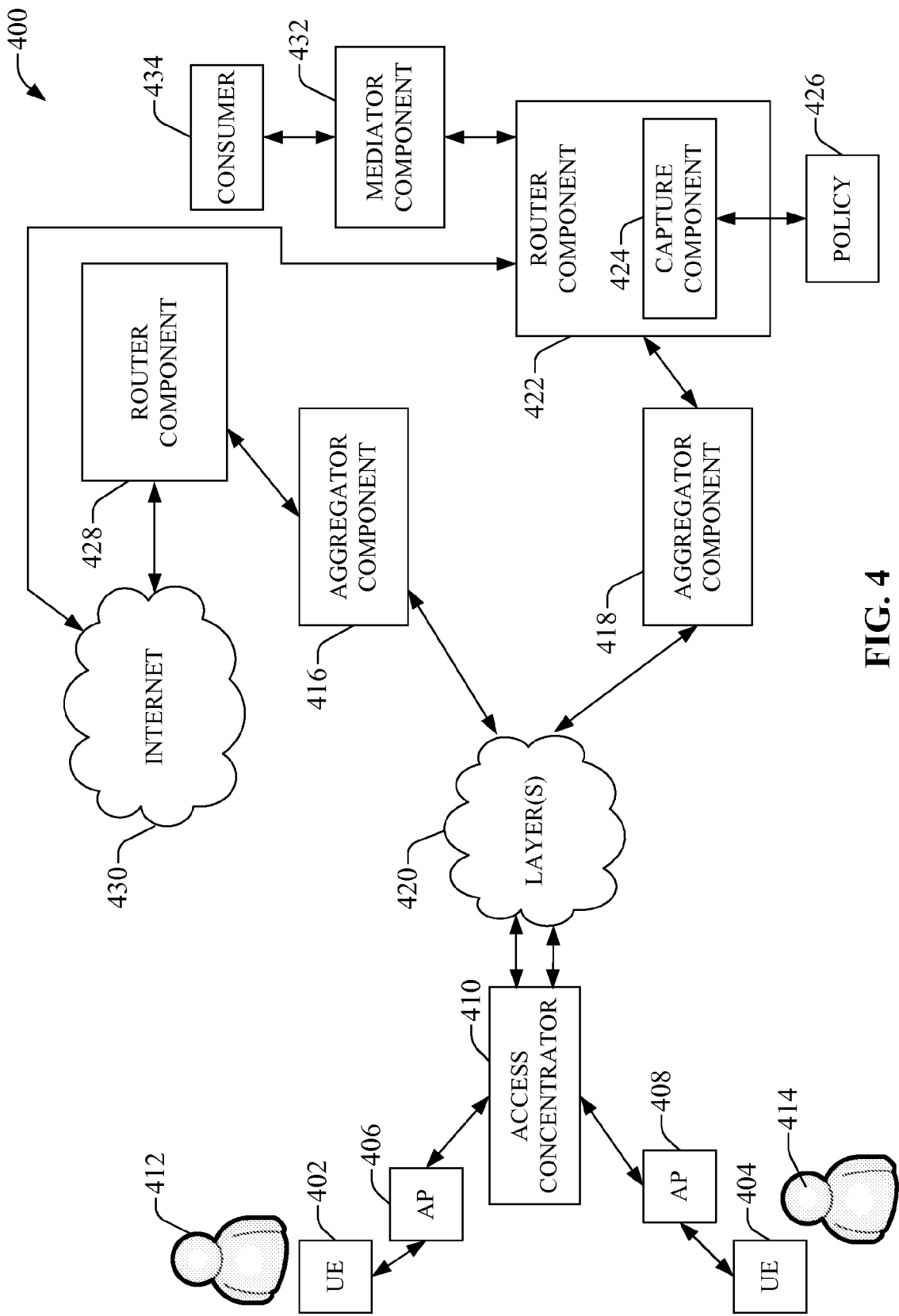
FIG. 4 illustrates a block diagram of an example system that can identify and capture data traffic associated with a subscriber of interest in a communication network in accordance with still another embodiment of the disclosed subject matter.

FIG. 4 illustrates a block diagram of an example system 400 that can identify and capture data traffic associated with a subscriber of interest in a communication network in accordance with still another embodiment of the disclosed subject matter. The system 400 can comprise UE 402 and 404, AP 406 and AP 408, access concentrator 410, subscribers 412 and 414 respectively associated with (e.g., utilizing) the UEs 402 and 404, aggregator components 416 and 418, layer(s) 420, router component 422, capture component 424, policy 426, router component 428, Internet 430, mediator component 432, and consumer(s) 434, wherein such components of the system 400 can comprise the same or similar functionality or features (or at least a desired portion of the functionality or features) of respectively named components, such as more fully described herein, for example, with regard to the system 100, system 200, and system 300.

In accordance with an aspect, data traffic associated with a subscriber(s) of interest, such as subscriber 414, and associated UE (e.g., 404), can be communicated to a unique aggregator component, such as the aggregator component 418, based at least in part on the public IP address(es) of the subscriber(s) of interest to facilitate capturing data traffic associated with the subscriber(s) of interest. In another aspect, the router component 422 can comprise the capture component 424, which can capture or intercept data traffic associated with a subscriber(s) of interest (e.g., 414) and the associated UE (e.g., UE 404), and the captured data traffic can be provided to the mediator component 432 to facilitate providing the captured data traffic to a desired consumer 434.

In an aspect, the UEs 402 and 404 each can be associated with (e.g., connected to) respective APs 406 and 408, which can facilitate communication (e.g., wireless communication) by the UEs with other communication devices associated with the communication network. The APs 406 and 408 can be associated with the access concentrator 410 (e.g., LAC) that can receive data traffic respectively associated with UEs (e.g., 402, 404) and can aggregate the data traffic at that point. The access concentrator 410 can be associated with the aggregator components 416 and 418, where the layer(s) 420 (e.g., Layer 3, Layer 4, . . . ) can be employed to facilitate communication of data between the access concentrator 410 and aggregator components 416 and 418. The aggregator component 416 can be associated with the router component 428, which can facilitate routing data traffic associated with the UE 402 and associated subscriber 412 (e.g., subscriber that is not of interest to a consumer 434) (and other subscribers that are not of interest to a consumer 434) to/from the Internet 430. The aggregator component 418 can be associated with another router component 422, which can comprise the capture component 424 and can be associated with the policy 426 and mediator component 432. The router component 422 also can facilitate routing data traffic associated with UE 404 and subscriber 410 (e.g., subscriber of interest to a consumer 434) (and other subscribers of interest to a consumer(s) 434) to/from the Internet 430. The mediator component 432 can be associated with a consumer(s) 434.

In accordance with an embodiment, the APs 406 and 408 can be a hotspot (e.g., Wi-Fi hotspot) or another type of AP, such as a base station, femtocell, picocell, etc., for example, that can facilitate communication by the respective UEs 402 and 404 in the communication network. The APs 406 and 408 can be associated with the access concentrator 410, which can aggregate data traffic associated with one or more subscribers (e.g., 412, 414) using respective UEs 402 and 404 that are respectively associated with the APs 406 and 408. In an aspect, the subscriber 414 can be a subscriber of interest to a consumer 434 and subscriber 412 can be an entity for which there is no particular interest by a consumer 434. A tunnel (e.g., communication tunnel) can be established between the access concentrator 410 and the aggregator component 416, and another tunnel can be established between the access concentrator 410 and the aggregator component 418. In an embodiment, the aggregator components 416 and 418 each can be or can comprise a network server, such as an LNS. The subscriber 412 and associated UE 402 can be assigned or associated with a specified public IP address by the access concentrator 410, where the specified public IP address can be identified as a public IP address associated with a subscriber (e.g., 412) for which there is no particular interest by a consumer 434. The subscriber 414 and associated UE 404 can be assigned or associated with a different public IP address by the access concentrator 410, where the different public IP address can be identified as a public IP address associated with a subscriber (e.g., 414) for which there is an interest by a consumer 434 with regard to data traffic capture. The respective public IP addresses can be assigned to the respective subscribers based at least in part on user information respectively associated with the subscribers.

In an aspect, the data traffic associated with subscriber 412 (and other subscribers for which there is no particular interest in by a consumer 434) can be communicated to and aggregated by the aggregator component 416 via the tunnel between the access concentrator 410 and the aggregator component 416. The aggregator component 416 can provide the data traffic it receives and aggregates to the router component 428, which can facilitate routing the data traffic to the Internet 430. The data traffic associated with subscriber 414 (e.g., and data traffic associated with other subscribers of interest to a consumer(s) 434) can be communicated to and aggregated by a unique or dedicated aggregator component, such as aggregator component 418, via the tunnel between the access concentrator 410 and aggregator component 418, where the aggregator component 418 can be employed to aggregate and process data traffic associated with a subscriber(s) of interest, such as subscriber 414. The capture component 424, in router component 422, can monitor data traffic respectively associated with the subscribers of interest, such as subscriber 414, and respectively associated public IP addresses to facilitate identifying data traffic associated with a subscriber(s) of interest (e.g., 414). The capture component 4244 can analyze the data traffic and public IP addresses, and can utilize the policy 426 to facilitate determining which data traffic to capture or intercept, and can capture or intercept data traffic associated with a subscriber(s) of interest 414, based at least in part on the public IP address of the subscriber(s) of interest 414 and the policy 426. In another aspect, the router component 422 can facilitate communicating data traffic, such as data traffic associated with subscriber of interest 414 (and other subscribers of interest), to/from the Internet 430 from/to the UE 404 of the subscriber of interest 414 (and from/to communication devices of other subscribers of interest).

In still another aspect, the capture component 424 also can provide the captured data traffic (e.g., mined data traffic) to a mediator component 432, which can store the captured data traffic of respective subscriber(s) of interest (e.g., 414). The captured data traffic of a subscriber of interest 414 can be provided to a consumer 434, where the consumer 434 can utilize the data for desired purposes (e.g., store the captured data traffic, analyze or further process the captured data traffic, etc.).

Figure 5:
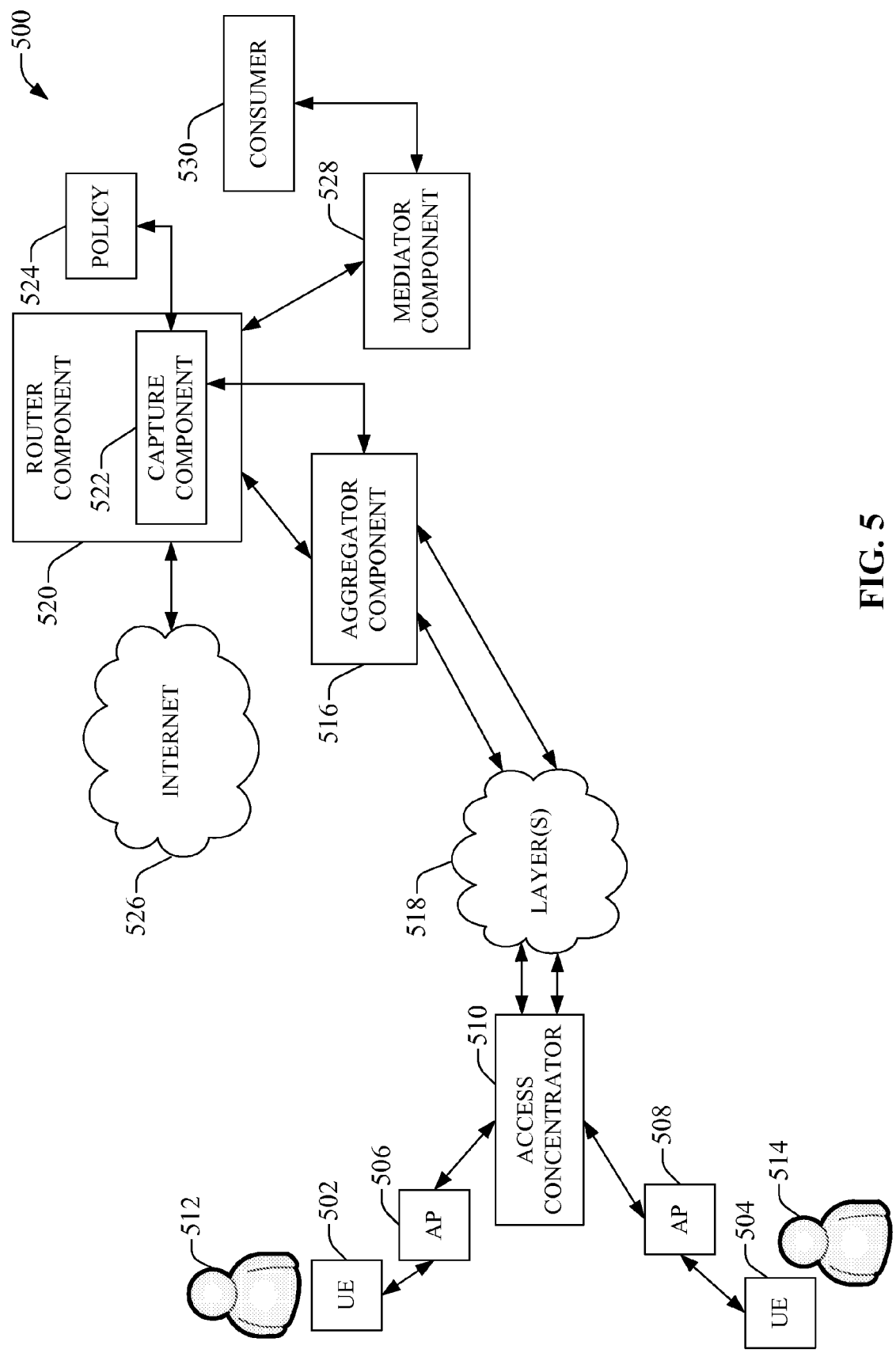
FIG. 5 a block diagram of an example system that can identify and capture data traffic associated with a subscriber of interest in a communication network in accordance with yet another embodiment of the disclosed subject matter.

FIG. 5 illustrates a block diagram of an example system 500 that can identify and capture data traffic associated with a subscriber of interest in a communication network in accordance with yet another embodiment of the disclosed subject matter. The system 500 can comprise UE 502 and 504, AP 506 and AP 508, access concentrator 510 (e.g., LAC), subscribers 512 and 514 respectively associated with (e.g., utilizing) the UEs 502 and 504, aggregator component 516 (e.g., LNS), layer(s) 518, router component 520, capture component 522, policy 524, Internet 526, mediator component 528, and consumer(s) 530, wherein such components of the system 500 can comprise the same or similar functionality or features (or at least a desired portion of the functionality or features) of respectively named components, such as more fully described herein, for example, with regard to the system 100, system 200, system 300, and system 400.

In accordance with an aspect, data traffic associated with a subscriber(s) of interest to a consumer 530, such as subscriber 514, and associated UE (e.g., 504), and data traffic associated with a subscriber(s) that is not of interest to a consumer 530, such as subscriber 508, and associated UE (e.g., 502) can be communicated to the same aggregator component, such as aggregator component 516. In another aspect, the router component 520 can comprise the capture component 522, which can capture or intercept data traffic associated with a subscriber(s) of interest (e.g., 514) and the associated UE (e.g., UE 504), and the captured data traffic can be provided to the mediator component 528 to facilitate providing the captured data traffic to a desired consumer 530.

In an aspect, the UEs 502 and 504 can be respectively associated with (e.g., connected to) APs 506 and 508, which can facilitate communication (e.g., wireless communication) in the communication network. The APs 506 and 508 can be associated with the access concentrator 510, which can facilitate aggregating data traffic respectively associated with the UEs 502 and 504 and associated subscribers 512 and 514. The access concentrator 510 can be associated with the aggregator component 516, where the layer(s) 518 can be employed to facilitate communication of data between the access concentrator 510 and aggregator component 516 in accordance with specified protocols. The aggregator component 516 can be associated with the router component 520, which can facilitate routing data traffic associated with UE 502 and associated subscriber 512 (e.g., subscriber that is not of interest to a consumer 530) and UE 504 and associated subscriber 514 (e.g., subscriber of interest to a consumer 530) to/from the Internet 526. The router component 520 can comprise the capture component 522, which can be employed to capture data traffic associated with a subscriber(s) of interest, such as subscriber 514, based at least in part on a public IP address(es) associated with the subscriber(s) of interest and in accordance with the policy 524, and can be associated with the policy 524 and mediator component 528. The mediator component 528 can be associated with a consumer(s) 530.

In accordance with an embodiment, the APs 506 and 508 can be a hotspot (e.g., Wi-Fi hotspot) or another type of AP, such as a base station, femtocell, picocell, etc., that can communicate data traffic associated with respective subscribers to the access concentrator 510. The access concentrator 510 can receive and aggregate the data traffic respectively associated with one or more subscribers (e.g., 512, 514) respectively associated with the APs 506 and 508. In an aspect, the subscriber 514 can be a subscriber of interest to a consumer 530, and subscriber 512 can be an entity for which there is no particular interest by a consumer 530. In another aspect, a tunnel (e.g., communication tunnel) can be established between the access concentrator 510 and the aggregator component 516 in relation to data traffic associated with subscriber 512 and associated UE 502, and another tunnel can be established between the access concentrator 510 and the aggregator component 512 in relation to data traffic associated with subscriber 514 and associated UE 504. The access concentrator 510 can assign specified public IP address to the subscriber 512 and associated UE 502, where the specified public IP address can be identified as a public IP address associated with a subscriber (e.g., 512) for which there is no particular interest by a consumer 530. The access concentrator 510 can assign a different public IP address to the subscriber 514 and associated UE 504, where the different public IP address can be identified as a public IP address associated with a subscriber (e.g., 514) for which there is an interest by a consumer 530 with regard to data traffic capture. The respective public IP addresses can be assigned to the respective subscribers based at least in part on user information respectively associated with the subscribers.

In an aspect, the data traffic associated with subscriber 512 (and other subscribers for which there is no particular interest in data traffic capture) and data traffic associated with subscriber 514 (e.g., and data traffic associated with other subscribers of interest) can be communicated to the aggregator component 510 via their respective tunnels, and the data traffic can be aggregated by the aggregator component 516. The capture component 522, in router component 520, can monitor data traffic respectively associated with the subscribers of interest, such as subscriber 514, and respectively associated public IP addresses to facilitate identifying data traffic associated with a subscriber(s) of interest (e.g., 514). The capture component 522 can analyze the data traffic and respective public IP addresses, and can utilize the policy 524 to facilitate determining which data traffic to capture or intercept, and can capture or intercept data traffic associated with a subscriber(s) of interest 514, based at least in part on the public IP address of the subscriber(s) of interest 514 and the policy 524. In another aspect, the router component 520 can facilitate communicating data traffic, such as data traffic associated with subscriber 512 (and other subscribers that are not of interest to a consumer 530) and subscriber of interest 514 (and other subscribers of interest to a consumer 530), to/from the Internet 526 from/to the UE 504 of the subscriber of interest 514 (and from/to communication devices of other subscribers of interest).

In still another aspect, the capture component 522 can provide the captured data traffic (e.g., mined data traffic) to a mediator component 528, which can respectively store the captured data traffic of respective subscriber(s) of interest (e.g., 514). The captured data traffic of a subscriber of interest 514 can be provided to a consumer 530, where the consumer 530 can utilize the data for desired purposes (e.g., store the captured data traffic, analyze or further process the captured data traffic, etc.).

Figure 6:
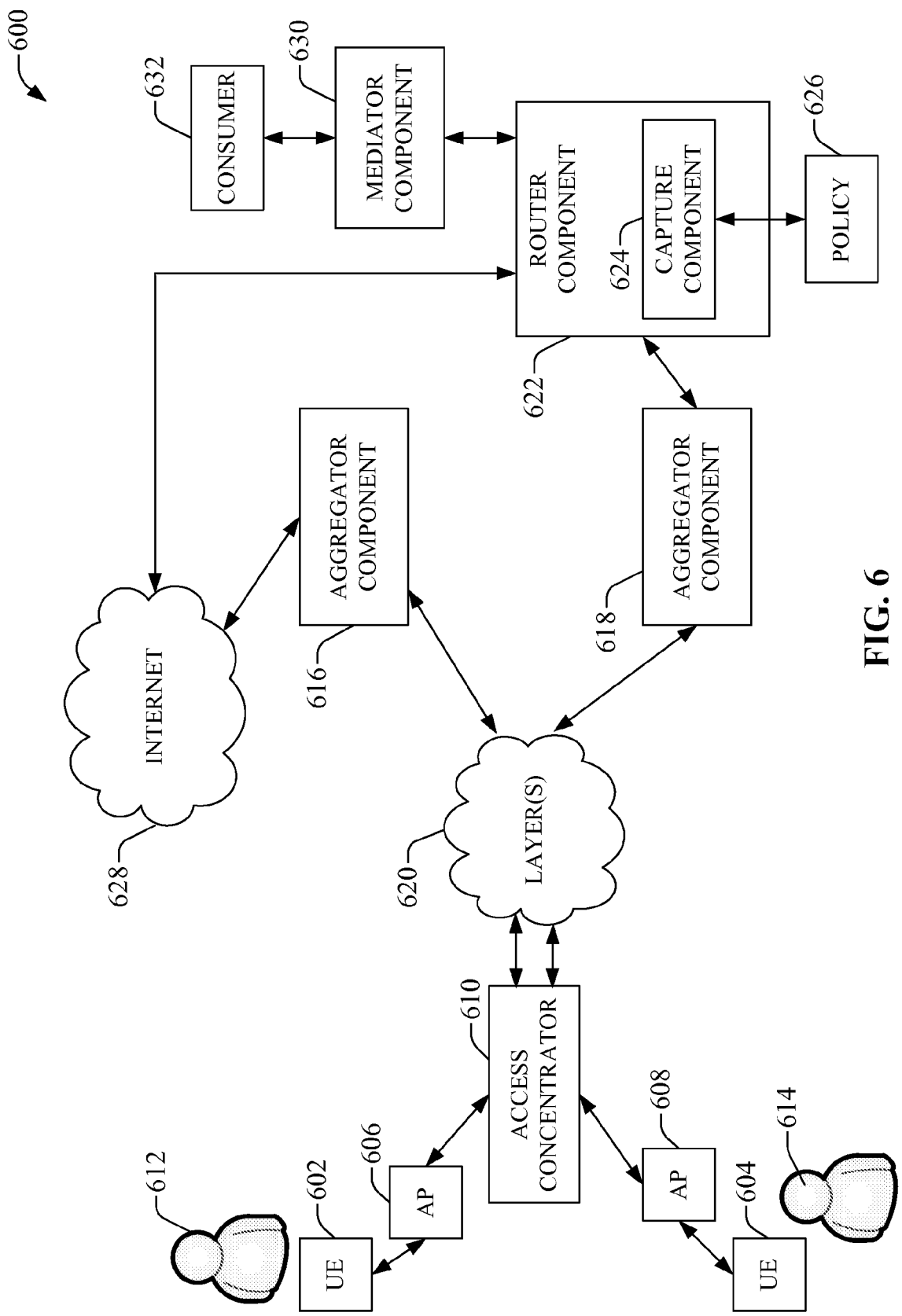
FIG. 6 illustrates a block diagram of an example system that can identify and capture data traffic associated with a subscriber of interest in a communication network in accordance with another embodiment of the disclosed subject matter.

FIG. 6 illustrates a block diagram of an example system 600 that can identify and capture data traffic associated with a subscriber of interest in a communication network in accordance with another embodiment of the disclosed subject matter. The system 600 can comprise UE 602 and UE 604, AP 606 and AP 608, access concentrator 610 (e.g., LAC), subscribers 612 and 614 respectively associated with (e.g., utilizing) the UEs 602 and 604, aggregator components 616 and 618 (e.g., LNSs), layer(s) 620 (e.g., Layer 3, Layer 4, . . . ), router component 622, capture component 624, policy 626, Internet 628, mediator component 630, and consumer(s) 632, wherein such components of the system 600 can comprise the same or similar functionality or features (or at least a desired portion of the functionality or features) of respectively named components, such as more fully described herein, for example, with regard to the system 100, system 200, system 300, system 400, and system 500.

In accordance with an aspect, data traffic associated with a subscriber(s) of interest (e.g., to a consumer 632), such as subscriber 614, and associated UE (e.g., 604), can be communicated to a unique aggregator component, such as the aggregator component 618, based at least in part on the public IP address(es) of the subscriber(s) of interest to facilitate capture of data traffic associated with the subscriber(s) of interest. In another aspect, the router component 622 can comprise the capture component 624, which can capture or intercept data traffic associated with a subscriber(s) of interest (e.g., 614) and the associated UE (e.g., UE 604), and the captured data traffic can be provided to the mediator component 630 to facilitate providing the captured data traffic to a desired consumer 632. In still another aspect, data traffic associated with a subscriber(s) (e.g., 612) that is not of interest to a consumer 632 can be directly routed from the aggregator component 616 to/from the Internet 628.

In an aspect, UE 602 and UE 604 can be respectively associated with (e.g., connected to) the AP 606 and AP 608, where the APs 606 and 608 can facilitate enabling the UEs 602 and 604 to communicate with desired communication devices associated with the communication network. The APs 606 and 608 can be associated with the aggregator component 610 that can aggregate the data traffic respectively associated with the UEs, such as UE 602 and 604. The access concentrator 610 can be associated with the aggregator components 616 and 618, where the layer(s) 620 can be employed to facilitate communication of data between the access concentrator 610 and the respective aggregator components 616 and 618. In another aspect, the aggregator component 616 can directly route data traffic associated with the UE 602 and associated subscriber 612 (e.g., subscriber that is not of interest to a consumer 632) to/from the Internet 628 from/to the UE 602. The aggregator component 618 can be associated with router component 622, which can comprise the capture component 624, and can be associated with the policy 626 and mediator component 630. The router component 622 also can facilitate routing data traffic associated with UE 604 and subscriber 614 (e.g., subscriber of interest to a consumer 632) to/from the Internet 628 from/to the UE 604. The mediator component 630 can be associated with a consumer(s) 632.

In accordance with an embodiment, can be a hotspot (e.g., Wi-Fi hotspot) or another type of AP, such as a base station, femtocell, picocell, etc., that can communicate data traffic associated with respective subscribers to the access concentrator 610. The access concentrator 610 can receive and aggregate the data traffic respectively associated with one or more subscribers (e.g., 612, 614) respectively associated with APs 606 and 608. In an aspect, the subscriber 614 can be a subscriber of interest to a consumer 632 and subscriber 612 can be an entity for which there is no particular interest by a consumer 632. A tunnel (e.g., communication tunnel) can be established between the access concentrator 610 and the aggregator component 616, and another tunnel can be established between the access concentrator 610 and the aggregator component 618. The access concentrator 610 can assign a specified public IP address to subscriber 612 and associated UE 602, where the specified public IP address can be identified as a public IP address associated with a subscriber (e.g., 612) for which there is no particular interest by a consumer 632. The access concentrator 610 can assign a different public IP address to the subscriber 614 and associated UE 604, where the different public IP address can be identified as a public IP address associated with a subscriber (e.g., 614) for which there is an interest by a consumer 632 with regard to data traffic capture. The respective public IP addresses can be assigned to the respective subscribers based at least in part on user information respectively associated with the subscribers.

In an aspect, the data traffic associated with subscriber 612 (and other subscribers for which there is no particular interest by a consumer 632) can be communicated to the aggregator component 616 via the tunnel between the access concentrator 610 and the aggregator component 616, and the data traffic can be aggregated by the aggregator component 616. The aggregator component 616 can directly provide the data traffic it receives and aggregates to the Internet 628. The data traffic associated with subscriber 614 (e.g., and data traffic associated with other subscribers of interest) can be communicated to the aggregator component 618 (e.g., unique aggregator component dedicated to aggregating data traffic associated with subscribers of interest) via the tunnel between the access concentrator 610 and the aggregator component 618, and the data traffic associated with subscribers of interest can be aggregated by the aggregator component 618. The capture component 624, in router component 622, can monitor data traffic respectively associated with the subscribers of interest, such as subscriber 614, and respectively associated public IP addresses to facilitate identifying data traffic associated with a subscriber(s) of interest (e.g., 614). The capture component 624 can analyze the data traffic and can utilize the policy 626 to facilitate determining which data traffic to capture or intercept, and can capture or intercept data traffic associated with a subscriber(s) of interest 614, based at least in part on the public IP address of the subscriber(s) of interest 614 and the policy 626. In another aspect, the router component 622 can facilitate communicating data traffic, such as data traffic associated with subscriber of interest 614 (and other subscribers of interest), to/from the Internet 628 from/to the UE 604.

In still another aspect, the capture component 624 can provide the captured data traffic (e.g., mined data traffic) to a mediator component 632, which can store the captured data traffic of respective subscriber(s) of interest (e.g., 614). The captured data traffic of a subscriber of interest 614 can be provided to a consumer 632, where the consumer 632 can utilize the data for desired purposes (e.g., store the captured data traffic, analyze or further process the captured data traffic, etc.).

Figure 7:
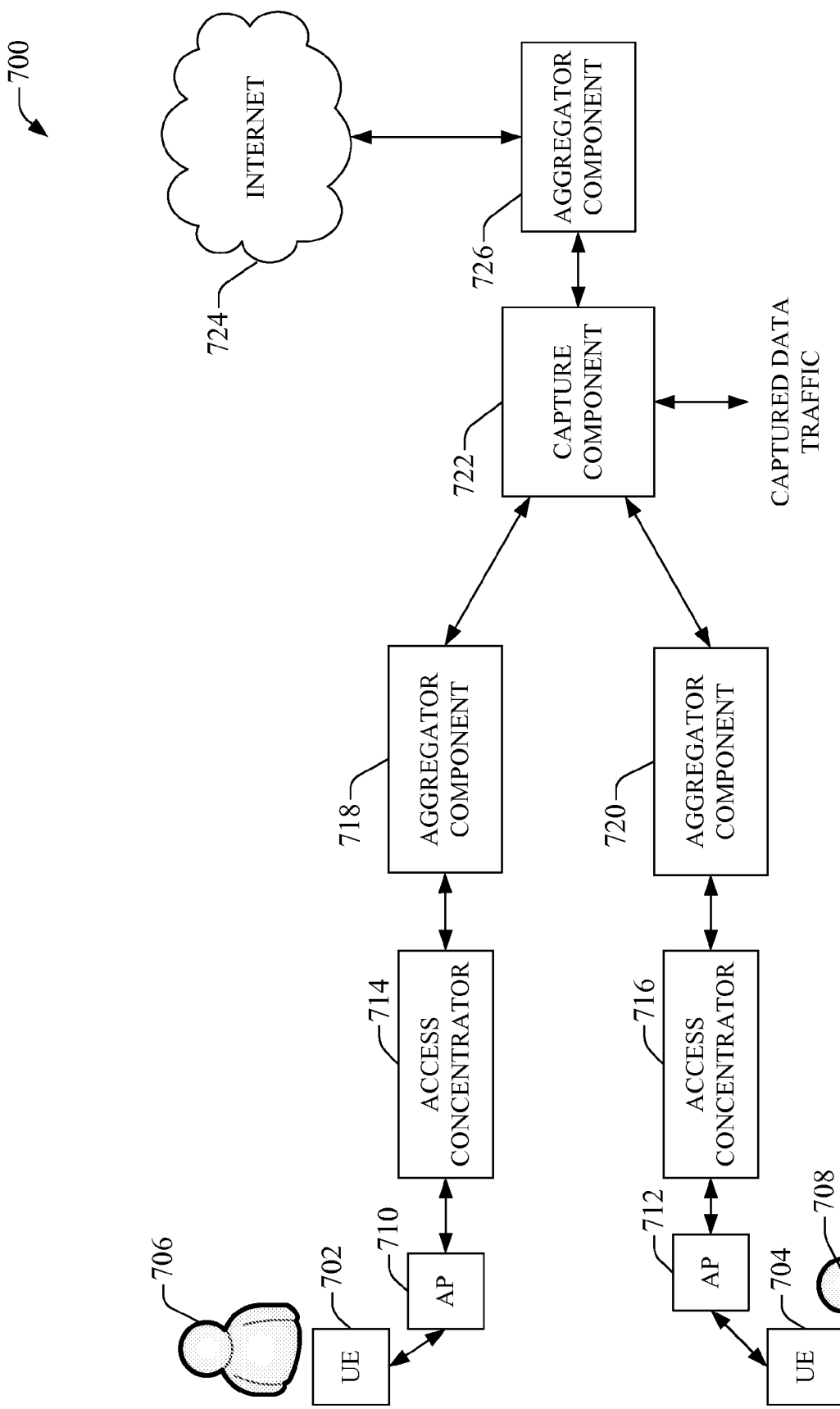
FIG. 7 depicts a block diagram of an example system that can aggregate data traffic and capture desired data traffic associated with a user equipment(s) (UE(s)) in accordance with an embodiment of the disclosed subject matter.

FIG. 7 illustrates a block diagram of an example system 700 that can aggregate data traffic and capture desired data traffic associated with a UE(s) in accordance with an embodiment of the disclosed subject matter. System 700 can comprise UEs 702 and 704 respectively associated with subscribers 706 and 708, APs 710 and 712, access concentrators 714 and 716 (e.g., LACs), aggregator components 718 and 720 (e.g., LNSs), capture component 722, wherein such components of the system 700 can comprise the same or similar functionality or features (or at least a desired portion of the functionality or features) of respectively named components, such as more fully described herein, for example, with regard to the system 100, system 200, system 300, system 400, system 500, and system 600. In an aspect, data traffic communicated in respective portions of the communication network using disparate types of technology or architecture (e.g., BRAS, document interchange architecture (DIA), etc.) can be aggregated at regional termination nodes, and data capture can be performed to capture data traffic associated with subscriber(s) of interest to a consumer(s).

The UEs 702 and 704 can be respectively associated with (e.g., wirelessly connected to) respective APs 710 and 712 to facilitate data communications by the respective UEs 702 and 704 in the communication network. The APs 710 and 712 can be respectively associated with access concentrators 714 and 716 that can facilitate routing data traffic respectively associated with the UEs 702 and 704 towards an ultimate desired destination (or from a source point), such as the Internet 724. In an aspect, the access concentrators 714 and 716 can assign respective public IP addresses to subscribers, such as subscribers 706 and 708, to facilitate identifying the subscribers and associated traffic (e.g., to facilitate distinguishing between subscribers of interest to a consumer and subscribers not of interest to a consumer). The respective public IP addresses can be assigned to the respective subscribers based at least in part on user information respectively associated with the subscribers. The access concentrator 714 can be associated with the aggregator component 718 and can establish a communication tunnel with an aggregator component 718 to facilitate communication of data traffic associated with the UE 702, and the access concentrator 716 can be associated with the other aggregator component 720 and can establish a communication tunnel with the other aggregator component 720 to facilitate communication of data traffic associated with the UE 704, where the aggregator components 718 and 720 can be regional termination points or nodes in the communication network of system 700. In an embodiment, the aggregator component 718 can be an LNS that can be a first type of server (e.g., BRAS) employing a first type of technology and/or architecture to facilitate data communications, and the aggregator component 720 can be a different type of aggregator component, such as an LNS that is a disparate type of server employing a disparate technology and/or architecture (e.g., DIA) to facilitate data communications.

In accordance with an aspect, the aggregator components 718 and 720 can be associated with a capture component 722 that can facilitate capturing desired data traffic (e.g., capturing and copying data traffic) associated with a subscriber(s) of interest to a consumer(s), in the communication network. The respective data traffic associated with respective subscribers (e.g., subscribers 706 and 708) can be aggregated at the respective aggregator components 718 and 720. In an embodiment, the capture component 722 can comprise an electronic probe or an optical probe, or can employ VACL capture, to facilitate capturing desired data traffic associated with a subscriber(s) of interest, as desired. In another aspect, the data traffic associated with subscribers, such as subscribers 706 and 708 can be communicated to another aggregator component 726, which can be a final termination point or node that is associated with the Internet 724. The captured data traffic can be provided to a desired consumer(s). In another aspect, the data traffic associated with the subscribers can be communicated to/from the Internet 724 (or other destination point or source point, such as a server) by the aggregator component 726.

Figure 8:
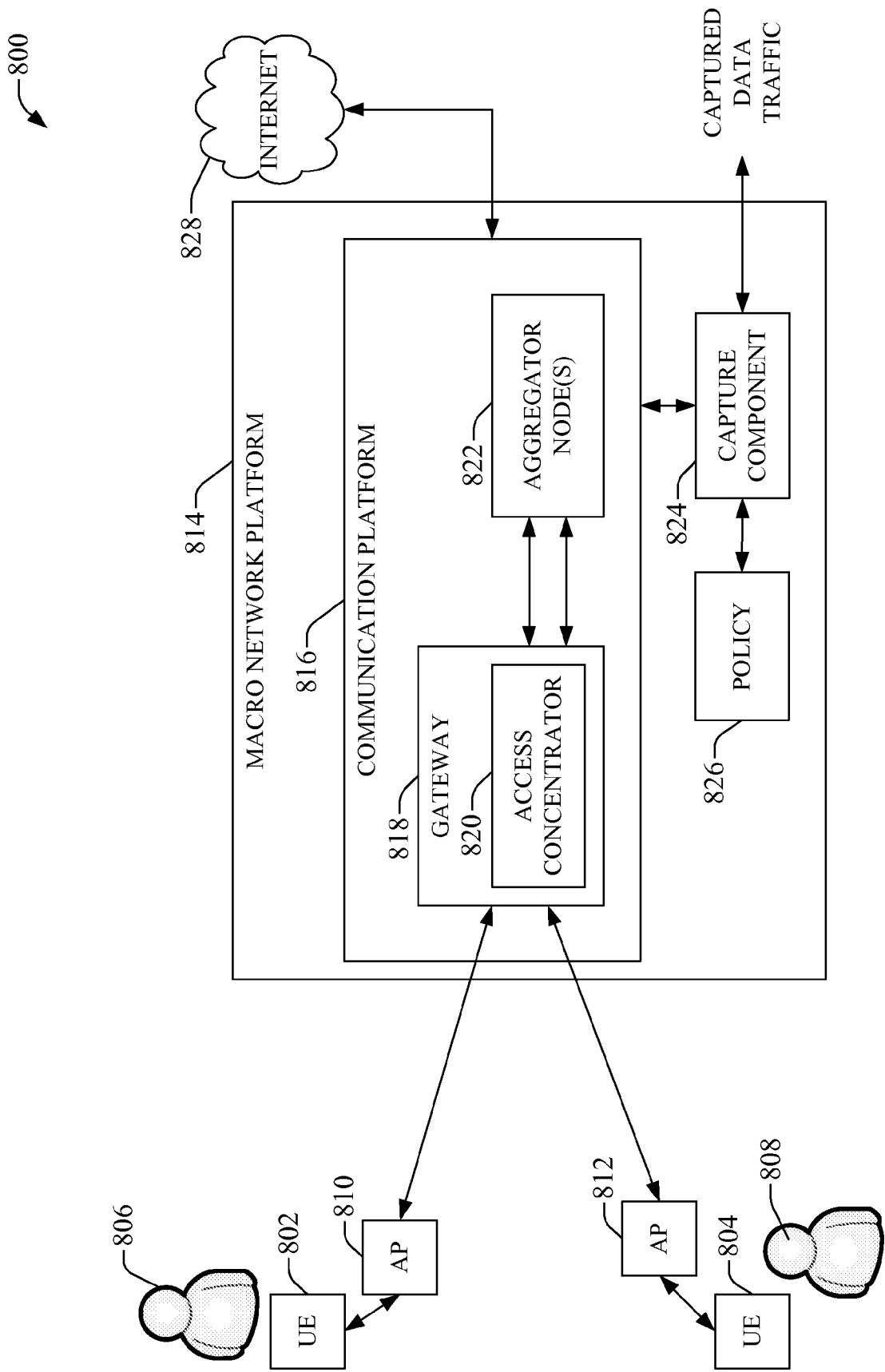
FIG. 8 depicts a block diagram of an example system that can aggregate data traffic and capture desired data traffic associated with a UE(s) in accordance with another embodiment of the disclosed subject matter.

FIG. 8 depicts a block diagram of an example system 800 that can aggregate data traffic and capture desired data traffic associated with a UE(s) in accordance with another embodiment of the disclosed subject matter. The example system 800 can comprise a desired number of UEs, such as UE 802 and UE 804 (e.g., mobile communication device) respectively associated with subscribers 806 and 808 in a communication network. The UEs 802 and 804 can be connected (e.g., wirelessly connected) to AP 810 and AP 812, respectively, to facilitate communication in the communication network. It is to be appreciated that while two UEs and two APs are depicted in system 800, the subject innovation is not so limited, as in accordance with the subject innovation, there also can be less than two UEs or more than two UEs, or less than two APs or more than two APs, as desired.

In an aspect, the system 800 can include a macro network platform 814 that can be associated with the APs 810 and 812 and can facilitate controlling (e.g., routing, capturing) data traffic of UEs, such as UEs 802 and 804, associated with the communication network. In an aspect, the macro network platform 814 can include communication platform 816 that can facilitate communication of data between communication devices in the communication network in accordance with specified protocols. The communication platform 816 can contain a gateway (GW) 818 that can interact with the APs 810 and 812 to facilitate data communication between the UEs and other communication devices in the network. In accordance with various embodiments, the GW 818 can be or can comprise an access concentrator 820 that can facilitate aggregating data traffic of respective UEs, such as UEs 802 and 804. The access concentrator 820 also can assign respective public IP addresses to respective subscribers (and respective data traffic) to facilitate distinguishing between subscribers of interest to a consumer and subscribers not of interest to a consumer. The respective public IP addresses can be assigned to the respective subscribers based at least in part on user information respectively associated with the subscribers. The communication platform 816 also can include one or more aggregation node(s) 822 (e.g., regional aggregation component(s) or hub(s)), which can be associated with the access concentrator 820, and where data traffic can be aggregated to facilitate analyzing the data traffic and respectively associated public IP addresses to identify and capture data traffic associated with a subscriber(s) of interest to a consumer. The access concentrator 820 can facilitate establishing communication tunnels between the access concentrator 820 and the one or more aggregation node(s) 822 in accordance with specified protocols. The communication platform 816 also can comprise other components, such as routers, other nodes (e.g., support nodes), switches, interfaces, processors, controllers, etc., that can facilitate communication of data between communication devices in the communication network in accordance with specified protocols.

In another aspect, the macro network platform 814 can include a capture component 824 that can be associated with the communication platform 816 and can capture data associated with a subscriber(s) of interest to a consumer based at least in part on a public IP address(es) associated with the subscriber(s) of interest and a policy 826 relating to data capture (e.g., comprising predefined data capture criteria). The capture component 824 can provide the captured data traffic, for example, to a consumer or the captured data traffic can be stored (e.g., in a mediator component) so that it can be provided to the consumer at a desired time. In still another aspect, the communication platform 820 can route data traffic of respective subscribers to a desired destination, such as the Internet 828 (or another desired destination (e.g., server)) (or from a desired source to respective UEs of subscribers).

Figure 9:
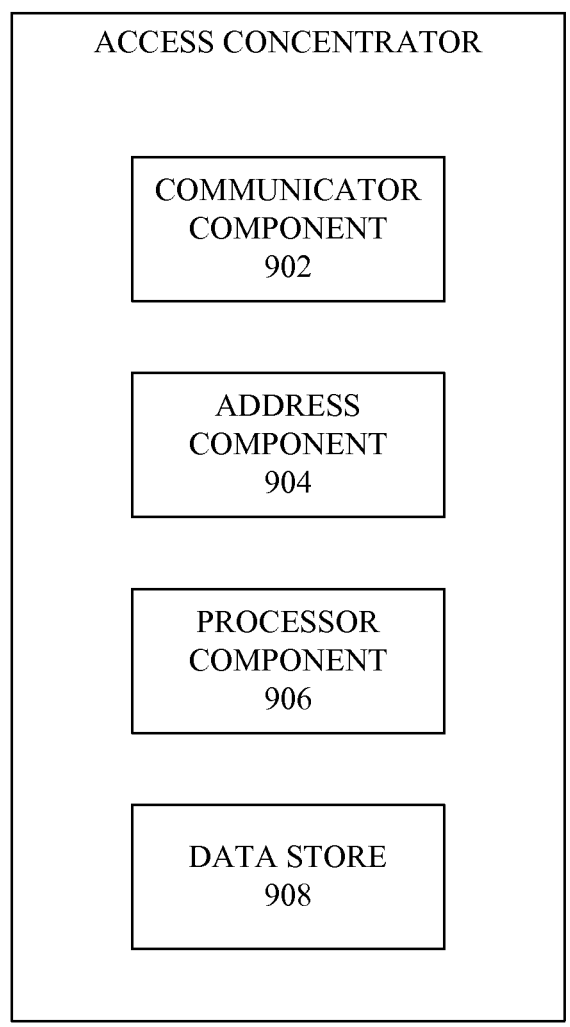
FIG. 9 illustrates a block diagram of an example access concentrator that can facilitate assigning respective public IP addresses to UEs and aggregating data traffic associated with UEs in accordance with an aspect of the disclosed subject matter.

FIG. 9 illustrates a block diagram of an example access concentrator 900 that can facilitate assigning respective public IP addresses to UEs and aggregating data traffic associated with UEs in accordance with an aspect of the disclosed subject matter. In an aspect, the access concentrator 900 can comprise a communicator component 902 that can facilitate communicating data to or receiving data from an AP(s) associated with the access concentrator 900. The communicator component 902 also can facilitate establishing respective tunnels (e.g., communication tunnels) between the access concentrator 900 and respective aggregator components (e.g., regional hubs) associated with the access concentrator 900 in the communication network in accordance with a specified protocol(s), where the communicator component 902 can facilitate communication of data between the access concentrator 900 and the aggregator components.

The access concentrator 900 also can comprise an address component 904 that can assign respective public IP addresses to respective UEs and respective associated subscribers. For instance, the address component 904 can assign a specified public IP address to a UE and an associated subscriber that is not of interest to a consumer, and can assign a disparate public IP address to a UE and an associated subscriber that is of interest to a consumer. The respective public IP addresses can be utilized to facilitate identifying subscribers and associated data traffic and distinguishing subscribers of interest from those subscribers that are not of interest.

In an aspect, the access concentrator 900 also can include a processor component 906 comprising one or more processors, microprocessors, or controllers that can be configured to confer and/or facilitate providing functionality, at least partially, to substantially any electronic component in or associated with the access concentrator 900. For instance, the processor(s) 906 can facilitate assigning respective public IP addresses to respective UEs associated with respective subscribers and/or analyzing user information of respective subscribers. In addition, the processor component 906 can facilitate operations on data (e.g., symbols, bits, or chips) for communicating data, creating tunnels between the access concentrator 900 and an aggregator component(s), etc.

In another aspect, the access concentrator 900 can include a data store 908 that can store data structures; code instructions; information related to assigning respective public IP addresses to respective UEs of respective subscribers; user information (e.g., information relating to access or authentication credentials) of respective subscribers; policy information; transmitting or receiving data; creating tunnels between the access concentrator 900 and an aggregator component(s); system or device information such as policies and specifications; and so on. The processor(s) 906 can be coupled to the data store 908 in order to store and retrieve information (e.g., information related to public IP addresses, etc.) desired to operate and/or confer functionality to the communicator component 902, address component 904, and/or other operational components of the access concentrator 900.

Figure 10:
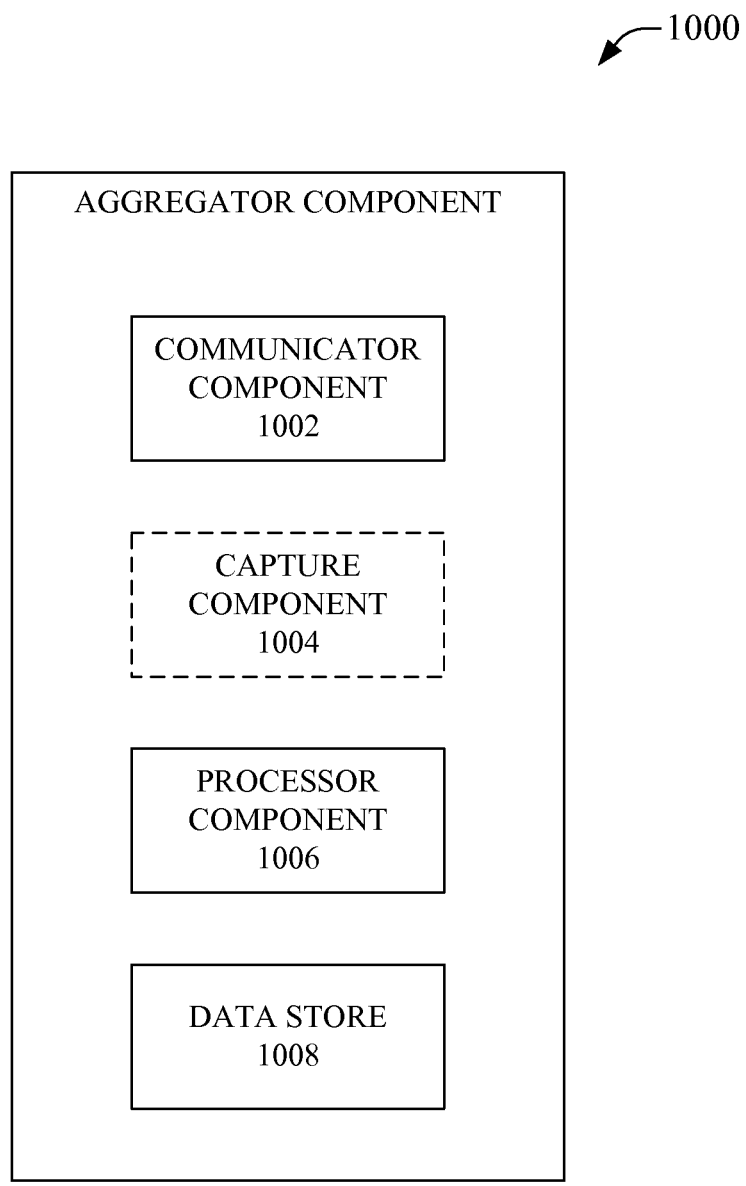
FIG. 10 depicts a block diagram of an example aggregator component that can facilitate aggregating data traffic associated with UEs in accordance with various aspects and embodiments of the disclosed subject matter.

FIG. 10 depicts a block diagram of an example aggregator component 1000 that can facilitate aggregating data traffic associated with UEs in accordance with various aspects and embodiments of the disclosed subject matter. In an aspect, the aggregator component 1000 can include a communicator component 1002 that can facilitate communicating data to or receiving data from an access concentrator associated with the aggregator component 1000. The communicator component 1002 can facilitate establishing a tunnel (e.g., communication tunnel) between the access concentrator and the aggregator component 1000 in accordance with a specified protocol(s), where the communicator component 1002 can facilitate communication of data between the aggregator component 1000 and the access concentrator. The communicator component 1002 also can route or forward data traffic to a desired destination (e.g., next destination), such as a router component, a node, the Internet, or a server, for example, as desired. In an aspect, data traffic associated with respective subscribers can be aggregated at regional aggregator components (e.g., regional hubs) in the network such that all or substantially all data traffic is aggregated at the aggregator components.

In accordance with various embodiments, the aggregator component 1000 optionally can comprise a capture component 1004 that can capture data traffic associated with a UE associated with a subscriber of interest based at least in part on a particular public IP address assigned to the data traffic associated with the subscriber of interest and a predefined policy. The capture component 1004 can analyze respective public IP addresses associated with data traffic associated with subscribers, where the subscribers can be subscribers of interest to a consumer and/or subscribers that are not of interest to a consumer. The capture component 1004 can receive and enforce a policy that can specify the subscriber(s) of interest and associated public IP address information. The capture component 1004 can identify data traffic associated with a subscriber of interest based at least in part on the public IP address associated with the data traffic. The capture component 1004 can capture the data traffic associated with a subscriber(s) of interest and can forward the captured data traffic to a mediator component (or directly to a consumer). In another aspect, the capture component 1004 also can forward the data traffic to the original desired destination (e.g., Internet; UE of the subscriber). For instance, the capture component 1004 can capture the desired data traffic and copy it to forward it to the mediator component or desired consumer, and also can forward the data traffic to or towards its original destination.

In an aspect, the aggregator component 1000 also can include a processor component 1006 comprising one or more processors, microprocessors, or controllers that can be configured to confer and/or facilitate providing functionality, at least partially, to substantially any electronic component in or associated with the aggregator component 1000. For instance, the processor(s) 1006 can facilitate aggregating data traffic associated with respective subscribers in the network, or (optionally) can facilitate analyzing respective public IP addresses of subscribers, identifying data traffic associated with subscribers of interest, enforcing a policy related to data capture, and capturing data traffic associated with subscribers of interest. In addition, the processor component 1006 can facilitate operations on data (e.g., symbols, bits, or chips) for communicating data, creating tunnels between the aggregator component 1000 and an access concentrator, etc.

In another aspect, the aggregator component 1000 can include a data store 1008 that can store data structures; code instructions; information related to transmitting or receiving data; creating tunnels between the aggregator component 1000 and an access concentrator; (optionally) analyzing public IP addresses associated with data traffic associated with respective subscribers, identifying data traffic associated with subscribers of interest, enforcing a policy related to data capture, and capturing data traffic associated with subscribers of interest; system or device information such as policies and specifications; and so on. The processor(s) 1006 can be coupled to the data store 1008 in order to store and retrieve information (e.g., policy, protocols, etc.) desired to operate and/or confer functionality to the communicator component 1002, (optional) capture component 1004, and/or other operational components of the aggregator component 1000.

Figure 11:
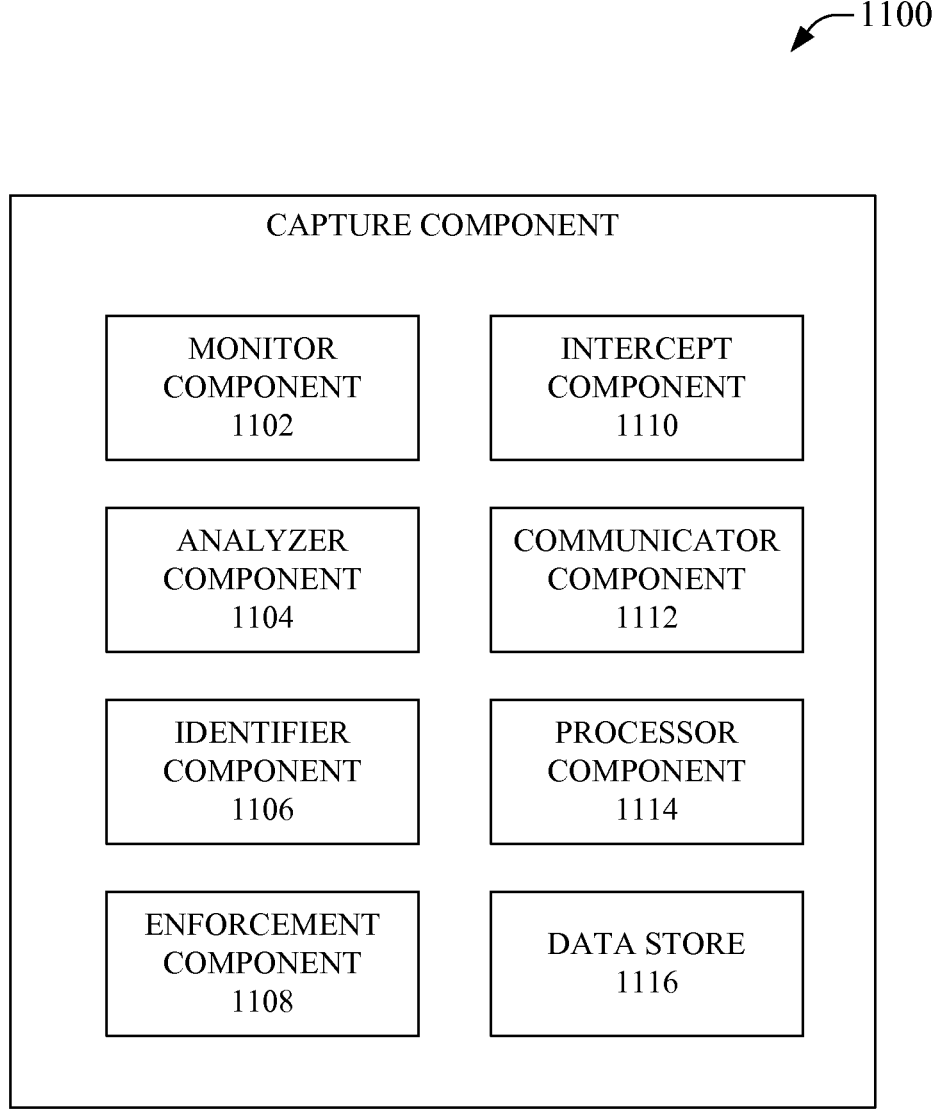
FIG. 11 illustrates a block diagram of an example capture component that can capture data traffic associated with a subscriber(s) of interest in accordance with an aspect of the disclosed subject matter.

FIG. 11 illustrates a block diagram of an example capture component 1100 that can capture data traffic associated with a subscriber(s) of interest in accordance with an aspect of the disclosed subject matter. In an aspect, the capture component 1100 can comprise a monitor component 1102 that can monitor public IP addresses associated with respective portions of data traffic and data traffic to facilitate identifying data traffic associated with subscribers of interest to a consumer. In an aspect, data traffic associated with a subscriber(s) that is not of interest to a consumer can be assigned a public IP address, while data traffic associated with a subscriber(s) of interest can be assigned a different public IP address to facilitate identifying data traffic associated with the subscriber(s) of interest. In another aspect, all or substantially all data traffic associated with UEs and associated subscribers can be aggregated at regional hubs, such as aggregator components, to facilitate monitoring of the data traffic.

The capture component 1100 also can include an analyzer component 1104 that can analyze and evaluate the public IP addresses and/or data traffic being monitored. The analyzer component can compare the monitored data with a policy that can include information that can indicate the public IP address(es) of a subscriber(s) of interest and/or data traffic to be captured to facilitate determining which data traffic to capture.

The capture component 1100 further can contain an identifier component 1106 that can identify portions of data traffic associated with a subscriber(s) of interest to be captured. The capture component 1100 can comprise an enforcement component 1108 that can enforce the policy to facilitate routing data traffic associated with subscribers and capturing data traffic associated with subscribers of interest.

In another aspect, the capture component 1100 can comprise an intercept component 1110 that can capture or intercept the portions of data traffic associated with a subscriber(s) of interest based at least in part on respective public IP addresses assigned to subscribers, where data traffic associated with a subscriber(s) of interest to a consumer can be assigned a public IP address that is different from a public IP address assigned to data traffic associated with a subscriber(s) not of interest to a consumer.

In still another aspect, the capture component 1100 can include a communicator component 1112 that can receive data and can route or transmit data traffic in accordance with the policy. In an aspect, data traffic associated with a subscriber(s) of interest can be captured in accordance with the policy. The communicator component 1112 can transmit captured data traffic to a mediator component to be provided to a consumer or can transmit the captured data traffic directly to the consumer, as desired. In another aspect, the communicator component 1112 can transmit data traffic respectively associated with subscribers to the respective desired destinations (e.g., the Internet).

The capture component 1100 also can contain a processor component 1114 that can comprise one or more processors, microprocessors, or controllers that can be configured to confer and/or facilitate providing functionality, at least partially, to substantially any electronic component in or associated with the capture component 1100. For instance, the processor(s) 1114 can facilitate monitoring data traffic associated with subscribers, analyzing public IP addresses respectively associated with data traffic of respective subscribers, identifying portions of data traffic associated with a subscriber(s) of interest, capturing portions of data traffic associated with a subscriber(s) of interest, enforcing a policy, etc. In addition, the processor component 1114 can facilitate operations on data (e.g., symbols, bits, or chips) for communicating data, such as for example, transmitting captured data traffic to a mediator component or consumer, routing or transmitting data traffic to respective desired destinations etc.

In yet another aspect, the capture component 1100 can comprise a data store 1116 that can store data structures; code instructions; information related to monitoring respective public IP addresses and respective data traffic associated with respective UEs of respective subscribers; analyzing respective public IP addresses associated with respective portions of data traffic; identifying portions of data traffic associated with a subscriber(s) of interest; enforcing a policy; capturing data traffic associated with a subscriber(s) of interest; transmitting or receiving data (e.g., routing data traffic to a desired destination, transmitting captured data traffic to a mediator component or directly to a consumer, etc.); system or device information such as policies and specifications; and so on. The processor(s) 1114 can be coupled to the data store 1116 in order to store and retrieve information (e.g., information related to public IP addresses, etc.) desired to operate and/or confer functionality to the monitor component 1102, analyzer component 1104, identifier component 1106, enforcement component 1108, intercept component 1110, communicator component 1112, processor component 1114, and/or other operational components of the capture component 1100.

Figure 12:
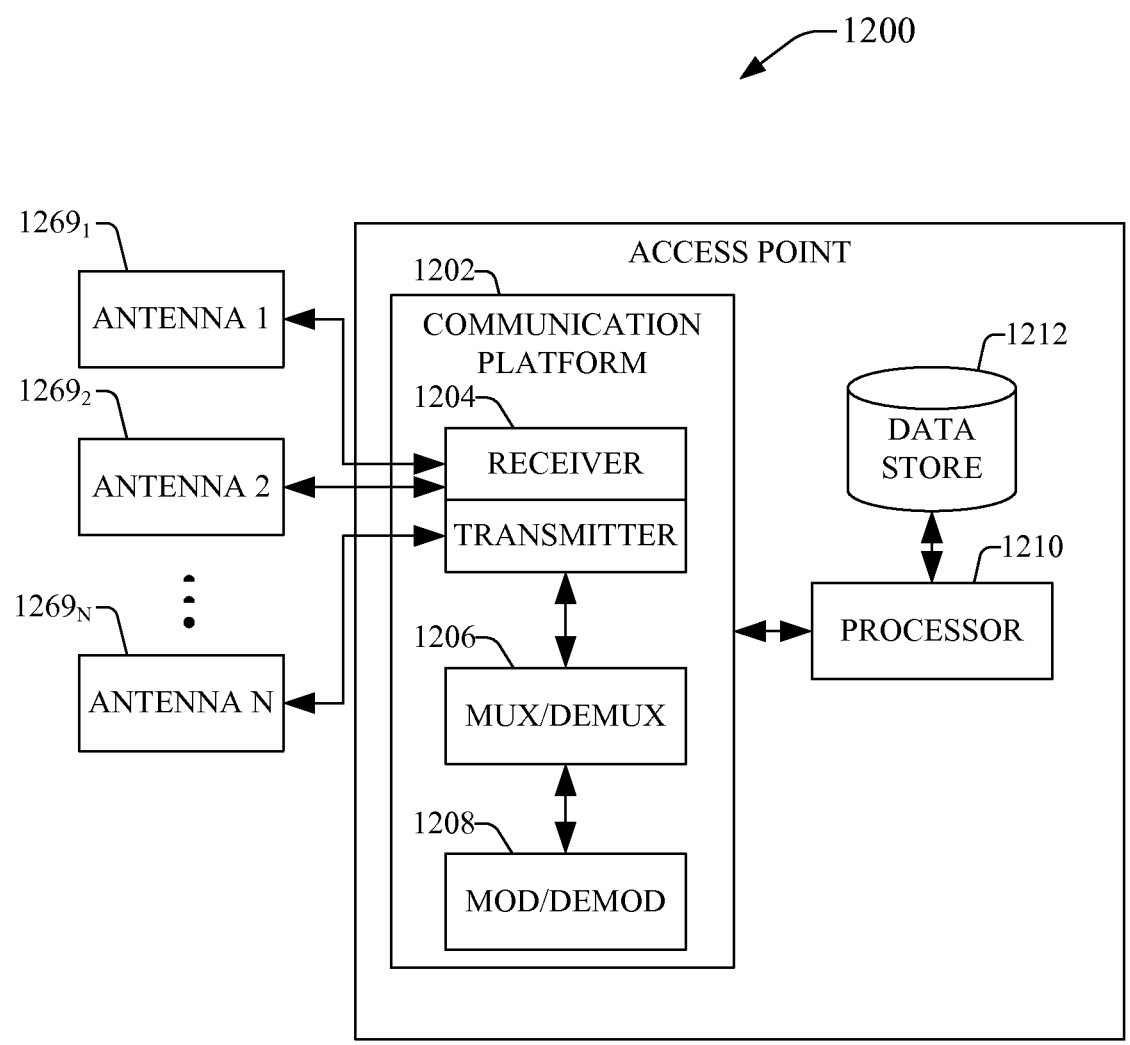
FIG. 12 depicts a block diagram of an example access point that can facilitate communication by and between communication devices in a communication environment in accordance with various embodiments of the disclosed subject matter.

FIG. 12 depicts a block diagram of an example AP 1200 that can facilitate communication by and between communication devices in a communication environment in accordance with various embodiments of the disclosed subject matter. The AP 1200 can receive and transmit signal(s) from and to wireless devices like APs (e.g., APs associated with hotspots, femto APs, pico APs, base stations, . . . ), access terminals, wireless ports and routers, and the like, through a set of antennas $1269_1$-$1269_N$. It should be appreciated that while antennas $1269_1$-$1269_N$ are a part of a communication platform 1202, which comprises electronic components and associated circuitry that can provide for processing and manipulation of received signal(s) and signal(s) to be transmitted. In an aspect, the communication platform 1202 can include a receiver/transmitter 1204 that can convert signal from analog to digital upon reception, and from digital to analog upon transmission. In addition, receiver/transmitter 1204 can divide a single data stream into multiple, parallel data streams, or perform the reciprocal operation.

In an aspect, coupled to receiver/transmitter 1204 can be a multiplexer/demultiplexer (mux/demux) 1206 that can facilitate manipulation of signal in time and frequency space. The mux/demux 1206 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1206 can scramble and spread information (e.g., codes) according to substantially any code known in the art, e.g., Hadamard-Walsh codes, Baker codes, Kasami codes, polyphase codes, and so on. A modulator/demodulator (mod/demod) 1208 also can be part of an operational group, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1200 also can comprise a processor(s) 1210 configured to confer and/or facilitate providing functionality, at least partially, to substantially any electronic component in or associated with the AP 1200. For instance, the processor(s) 1210 can facilitate operations on data (e.g., symbols, bits, or chips) for multiplexing/demultiplexing, such as effecting direct and inverse fast Fourier transforms, selection of modulation rates, selection of data packet formats, inter-packet times, etc.

In another aspect, the AP 1200 can include a data store 1212 that can store data structures; code instructions; information relating to communication conditions associated with the UE served by the AP 1200; rate coding information associated with the served UE; system or device information such as policies and specifications; code sequences for scrambling; spreading and pilot transmission; AP deployment and frequency plans; scheduling policies; and so on. The processor(s) 1210 can be coupled to the data store 1212 in order to store and retrieve information (e.g., information relating to communication conditions associated with UEs, rate coding information, etc.) desired to operate and/or confer functionality to the communication platform 1202, receiver/transmitter 1204, mux/demux component 1206, mod/demod 1208, and/or other operational components of AP 1200.

Figure 13:
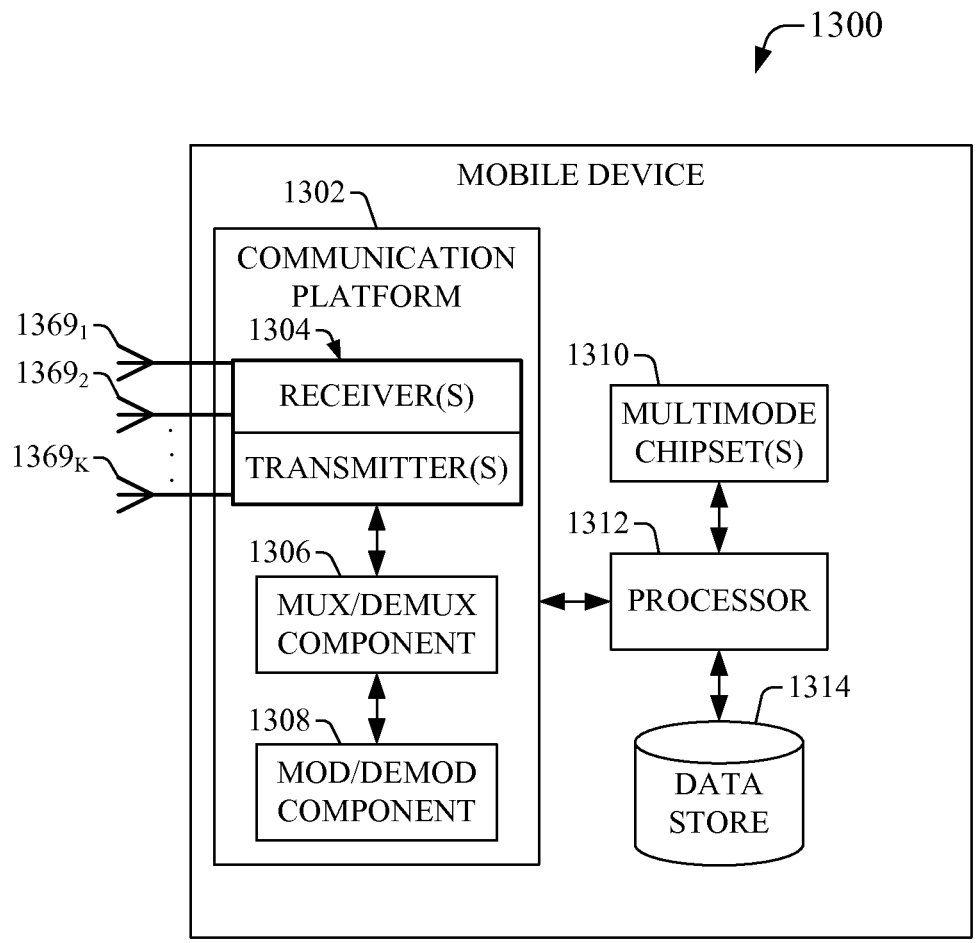
FIG. 13 depicts a block diagram of an example mobile device (e.g., UE) that can transmit and receive data in a communication environment in accordance with an embodiment of the disclosed subject matter.

FIG. 13 depicts a block diagram of an example mobile device 1300 (e.g., UE) that can transmit and receive data in a communication environment in accordance with an embodiment of the disclosed subject matter. In an aspect, the mobile device 1300 can be a multimode access terminal, wherein a set of antennas $1369_1$-$1369_Q$ (Q is a positive integer) can receive and transmit signal(s) from and to wireless devices like access points, access terminals, wireless ports and routers, and so forth, that operate in a radio access network. It should be appreciated that antennas $1369_1$-$1369_Q$ are a part of communication platform 1302, which comprises electronic components and associated circuitry that provide for processing and manipulation of received signal(s) and signal(s) to be transmitted; e.g., receivers and transmitters 1304, multiplexer/demultiplexer (mux/demux) component 1306, and modulation/demodulation (mod/demod) component 1308.

In another aspect, multimode operation chipset(s) 1310 can allow the mobile device 1300 to operate in multiple communication modes in accordance with disparate technical specification for wireless technologies. In an aspect, multimode operation chipset(s) 1310 can utilize communication platform 1302 in accordance with a specific mode of operation (e.g., voice, Global Positioning System (GPS)). In another aspect, multimode operation chipset(s) 1310 can be scheduled to operate concurrently (e.g., when Q>1) in various modes or within a multitask paradigm.

The mobile device 1300 also can include a processor(s) 1312 that can be configured to confer functionality, at least in part, to substantially any electronic component within the mobile device 1300, in accordance with aspects of the subject innovation. As an example, the processor(s) 1312 can facilitate enabling the mobile device 1300 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc., to facilitate communicating with other communication devices in the communication environment.

The mobile device 1300 also can contain a data store 1314 that can store data structures (e.g., user data, metadata); code structure(s) (e.g., modules, objects, classes, procedures) or instructions; information relating to communication conditions associated with the mobile device 1300; rate coding information associated with the mobile device 1300; network or device information like policies and specifications, attachment protocols; code sequences for scrambling, spreading and pilot (e.g., reference signal(s)) transmission; frequency offsets; cell IDs; and so on. In an aspect, the processor(s) 1312 can be functionally coupled (e.g., through a memory bus) to the data store 1314 in order to store and retrieve information (e.g., information relating to communication conditions associated with the mobile device 1300, rate coding information, etc.) desired to operate and/or confer functionality, at least in part, to communication platform 1302, receivers and transmitters 1304, mux/demux component 1306, mod/demod component 1308, multimode operation chipset(s) 1310, and/or substantially any other operational aspects of the mobile device 1300.

In accordance with one embodiment of the subject innovation, one or more components (e.g., aggregator component, capture component, . . . ) in the network can utilize artificial intelligence (AI) methods to infer (e.g., reason and draw a conclusion based at least in part on a set of metrics, arguments, or known outcomes in controlled scenarios) whether a particular subscriber is a subscriber of interest to a consumer; whether a portion(s) of data traffic is associated with a subscriber of interest; whether data traffic associated with a subscriber of interest is a type of data that is to be captured; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the system (e.g., system 100, system 200, system 300, system 400, system 500, system 600, system 700, system 800, system 900, system 1000, system 1100) to facilitate rendering an inference(s) related to the system.

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with the system to facilitate making inferences or determinations related to the system.

Figure 14:
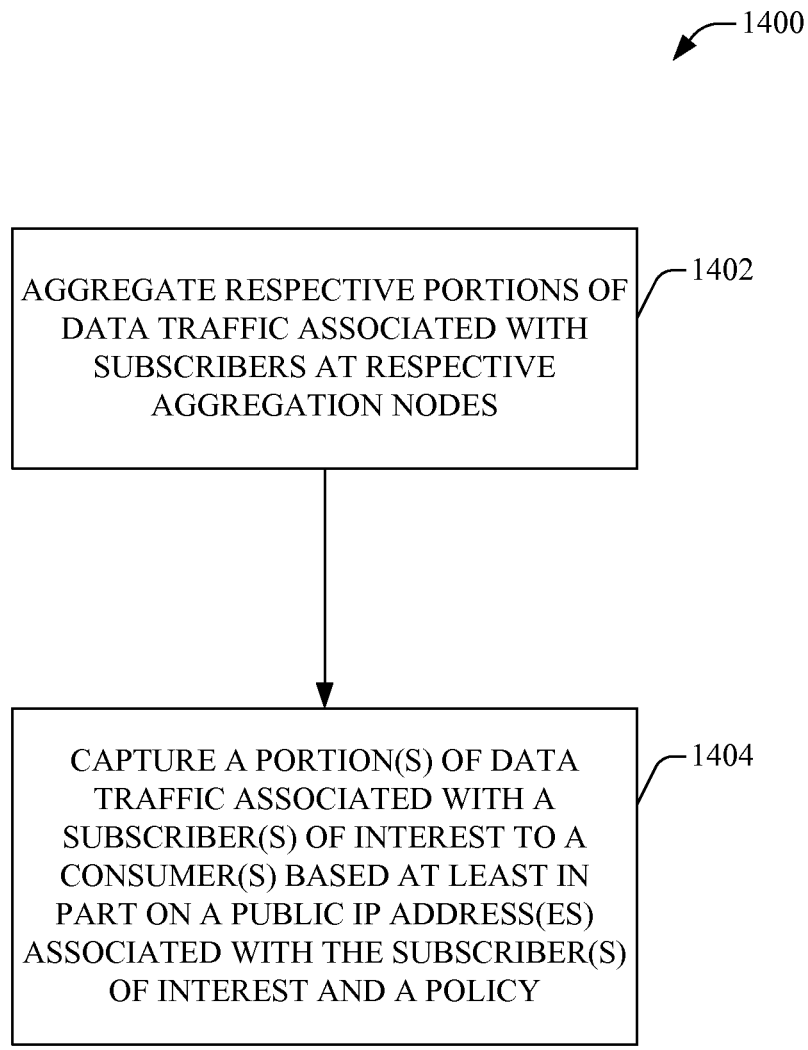
FIG. 14 illustrates a flowchart of an example methodology for aggregating data traffic and capturing data traffic associated with a subscriber(s) of interest in accordance with various aspects and embodiments of the disclosed subject matter.
Figure 15:
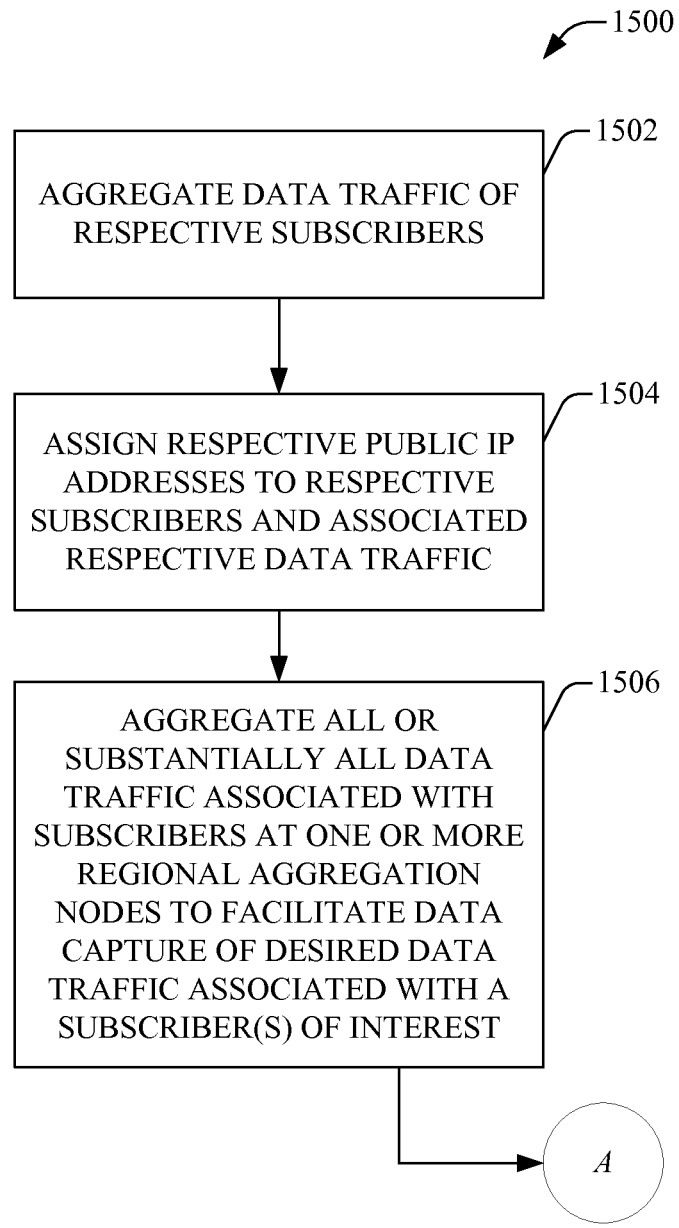
FIG. 15 depicts a flowchart of an example methodology that can aggregate data traffic to facilitate data capture in accordance with an aspect of the disclosed subject matter.
Figure 16:
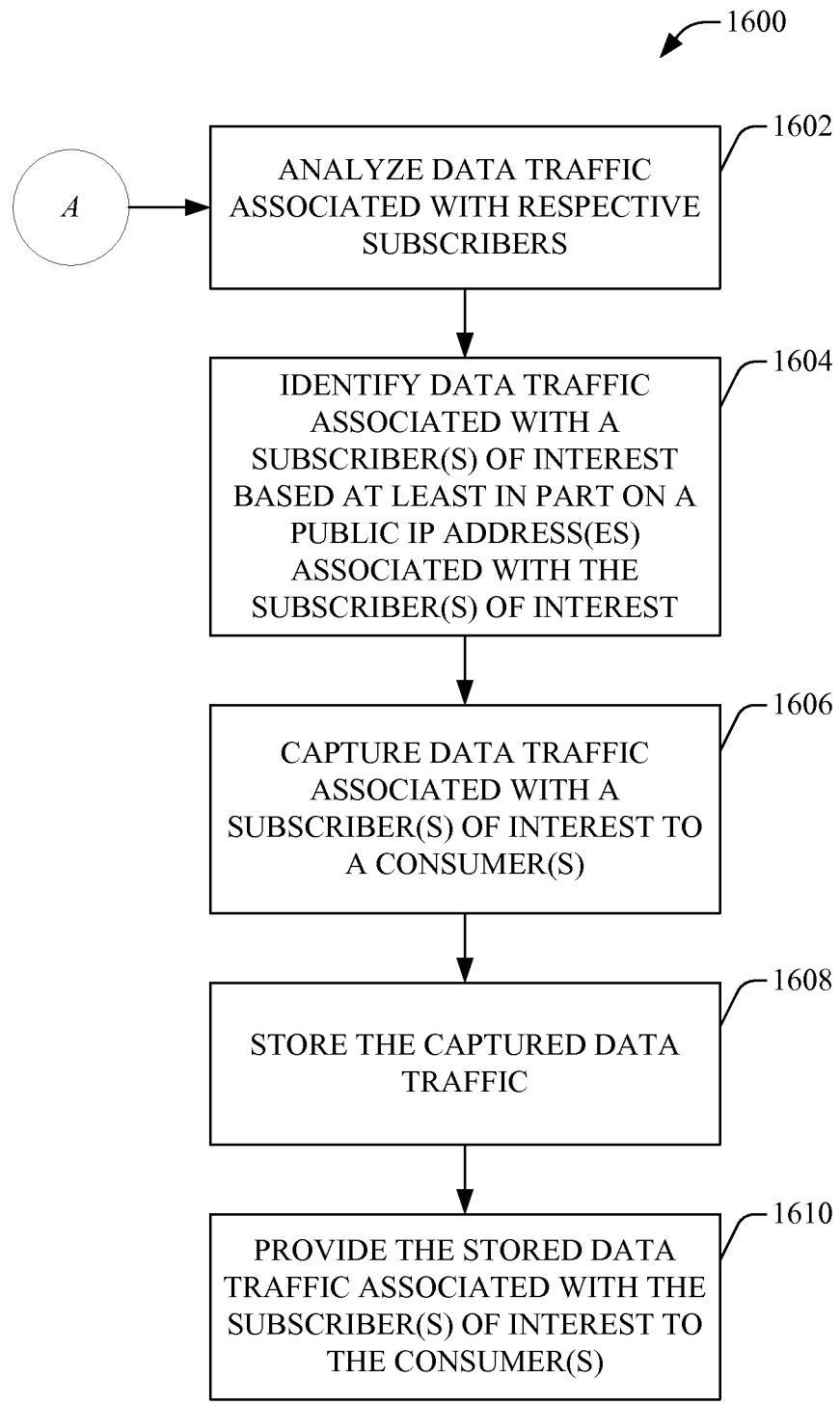
FIG. 16 illustrates a flowchart of an example methodology that can capture data traffic associated with a subscriber(s) of interest to a consumer(s) in accordance with an aspect of the disclosed subject matter.

In view of the example systems described herein, example methodologies that can be implemented in accordance with the disclosed subject matter can be better appreciated with reference to flowcharts in FIGS. 14-16. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

FIG. 14 presents a flowchart of an example methodology 1400 for aggregating data traffic and capturing data traffic associated with a subscriber(s) of interest in accordance with various aspects and embodiments of the disclosed subject matter. At 1402, respective portions of data traffic associated with subscribers can be aggregated at respective aggregation nodes in a communication network such that all or substantially all of the data traffic associated with subscribers is aggregated at least one of the aggregation nodes. In an aspect, data traffic associated with UEs and associated subscribers can be aggregated at one or more regional aggregation nodes (e.g., regional hubs) in the communication network to facilitate analyzing the data traffic and associated public IP addresses assigned to respective portions of data traffic associated with respective subscribers (e.g., subscriber(s) of interest to a consumer, subscriber(s) not of interest to a consumer). In an aspect, an access concentrator can assign respective public IP addresses to subscribers, based at least in part on user information respectively associated with the subscribers, to facilitate identifying the subscribers and associated traffic (e.g., to facilitate distinguishing between subscribers of interest to a consumer and subscribers not of interest to a consumer).

At 1404, a portion(s) of data traffic associated with a subscriber(s) of interest to a consumer(s) can be captured based at least in part on a public IP address(es) associated with the subscriber(s) of interest and a policy. In an aspect, data traffic associated with a subscriber(s) of interest to a consumer can be identified as being associated with a subscriber(s) of interest by comparing the public IP address assigned to and associated with the data traffic to information contained in a policy relating to data capture (e.g., comprising data capture criteria), which can indicate the public IP address and/or other provide other information that can facilitate identifying data traffic associated with a subscriber(s) of interest. Data traffic associated with a subscriber(s) of interest to a consumer(s) can be captured (e.g., by a capture component), and the captured data traffic can be provided to a mediator component, which can store the captured data traffic until provided to the consumer(s), or can be provided directly to the consumer(s). In another aspect, data traffic associated with subscribers also can be communicated to its original desired destination (e.g., the Internet; UE of a subscriber).

FIG. 15 depicts a flowchart of an example methodology 1500 that can aggregate data traffic to facilitate data capture in accordance with an aspect of the disclosed subject matter. At 1502, data traffic of respective subscribers can be aggregated. In an aspect, all or substantially all data traffic associated with UEs and associated subscribers can be aggregated via an access concentrator, for example. The access concentrator can be associated with APs in the communication network, where the APs can be serving respective UEs of subscribers, and the access concentrator can receive and aggregate the respective data traffic associated with respective subscribers.

At 1504, respective public IP addresses can be assigned to respective subscribers and associated respective data traffic. In an aspect, the access concentrator can analyze user information of respective subscribers to facilitate identifying respective subscribers (e.g., to identify subscribers of interest to a consumer. The access concentrator can assign a specified public IP address(es) to a subscriber(s) and associated data traffic that is not of interest to a consumer, and can assign a different public IP address(es) to a subscriber(s) and associated data traffic that is of interest to a consumer to facilitate distinguishing between the data traffic associated with a subscriber(s) of interest and data traffic associated with a subscriber(s) that is not of interest. The access concentrator can receive information (e.g., user information, policy information) indicating which subscriber(s) is of interest to a consumer, so that the access concentrator can know which subscriber(s) and associated data traffic is of interest to a consumer.

At 1506, all or substantially all data traffic associated with subscribers can be aggregated at one or more regional aggregation nodes to facilitate data capture of desired data traffic associated with a subscriber(s) of interest. In an aspect, the access concentrator can be associated with one or more regional aggregation nodes (e.g., aggregator components or hubs) in the communication network. All or substantially all data traffic associated with the subscribers can be communicated to and aggregated at the one or more regional aggregation nodes (e.g., respective portions of the data traffic can be at each regional aggregation node). In accordance with various embodiments, as desired, data traffic associated with subscribers of interest and subscribers not of interest can be communicated to a same regional aggregation node(s); or data traffic associated with subscribers of interest can be communicated to one or more regional aggregation nodes and data traffic associated with subscribers not of interest can be communicated to one or more different regional aggregation nodes. Aggregating the data traffic associated with the subscribers at desired regional aggregation nodes can facilitate data capture of desired data traffic associated with respective subscribers of interest, as all or substantially all data traffic and associated public IP addresses can be analyzed to identify data traffic associated with a subscribers(s) of interest. At this point, methodology can proceed to reference point A, where data capture can be performed, such as more fully described with regard to FIG. 16 and methodology 1600.

FIG. 16 illustrates a flowchart of an example methodology 1600 that can capture data traffic associated with a subscriber(s) of interest to a consumer(s) in accordance with an aspect of the disclosed subject matter. In an aspect, the methodology 1600 can proceed from reference point A, from where methodology 1500 left off, and where data traffic associated with subscribers (e.g., subscriber(s) of interest to a consumer(s), subscriber(s) who is not of interest to a consumer(s)) is aggregated at one or more regional aggregation nodes in the communication network.

At 1602, data traffic associated with respective subscribers can be analyzed. In an aspect, a capture component can monitor data traffic associated with subscribers, where the data traffic can be aggregated at one or more regional aggregator nodes in the network. In an aspect, the capture component can monitor a particular regional aggregator node to which data traffic associated with a subscriber(s) of interest is routed or can monitor data traffic at more than one regional aggregator node(s). In another aspect, the capture component can analyze aggregated portions of data traffic and respectively associated public IP addresses of the portions of data traffic associated with respective subscribers based at least in part on a policy relating to data capture, where the policy can indicate a subscriber(s) of interest to a consumer(s) (e.g., a public IP address(es) associated with a subscriber(s) of interest) and/or data traffic desired to be captured for the consumer(s). The capture component can apply the policy to the aggregated data traffic (e.g., evaluate or compare the data traffic with predefined data capture criteria specified in the policy) to facilitate determining whether and which portions of the data traffic are associated with a subscriber(s) of interest.

At 1604, data traffic associated with a subscriber(s) of interest can be identified based at least in part on a public IP address(es) associated with the subscriber(s) of interest. In an aspect, the capture component can identify a portion(s) of data traffic associated with a subscriber(s) of interest in the data traffic aggregated at the one or more regional aggregation nodes based at least in part on the public IP address(es) associated with the subscriber(s) of interest and the policy.

At 1606, data traffic associated with a subscriber(s) of interest to a consumer(s) can be captured. In one aspect, the capture component can capture data traffic, or at least a desired portion thereof, identified as being associated with a subscriber(s) of interest to the consumer(s) from the one or more regional aggregation nodes at which the desired data traffic is aggregated.

At 1608, the captured data traffic can be stored. In an aspect, the captured data traffic associated with a subscriber(s) of interest can be provided (e.g., transmitted) to a mediator component, and the captured data traffic can be stored in the mediator component. At 1610, the stored data traffic associated with the subscriber(s) of interest can be provided to the consumer(s). In an aspect, the mediator component can provide the stored data traffic to the consumer(s) that desired the data traffic associated with a subscriber(s) of interest. The consumer(s) can utilize or process (e.g., perform DPI on the header information and payload) the data traffic associated with the subscriber(s) of interest as desired by the consumer(s). In another aspect, data traffic associated with subscribers aggregated at the one or more aggregation nodes can be routed to the respective original destinations (e.g., the Internet; UE of a subscriber).

It is to be appreciated and understood that components (e.g., UE (e.g., mobile device), AP, access concentrator, router component, capture component, mediator component, . . . ), as described with regard to a particular system or methodology, can include the same or similar functionality as respective components as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    assigning, by a system comprising a processor, a first public network address to a first communication device of a set of communication devices to facilitate indicating that a first user identity associated with the first communication device is a user identity of interest based on first information associated with the first user identity, in accordance with a defined policy relating to traffic capture;
    assigning, by the system, a second public network address to a second communication device of the set of communication devices to facilitate indicating that a second user identity associated with the second communication device is a user identity that is not of interest based on second information associated with the second user identity, in accordance with the defined policy;
    aggregating, by the system, portions of traffic respectively associated with communication devices of the set of communication devices at a set of regional aggregation node devices associated with a set of regions of a communication network to facilitate analyzing the portions of traffic, wherein the portions of traffic comprise a first portion of traffic associated with the first communication device and a second portion of traffic associated with the second communication device;
    analyzing, by the system, the portions of traffic comprising address information indicating public network addresses respectively associated with the portions of traffic, wherein the public network addresses comprise the first public network address and the second public network address; and
    capturing, by the system, the first portion of the traffic associated with the first communication device based on a defined capture criterion associated with the defined policy and a result of the analyzing the portions of traffic indicating the first portion of traffic is associated with the first public network address, wherein the defined capture criterion relates to capture of traffic associated with communication devices associated with user identities of interest.

2. The method of claim 1, further comprising:
    receiving, by the system, the portions of traffic respectively associated with the set of communication devices; and
    creating, by the system, respective communication tunnels between an access concentrator device and the set of regional aggregation node devices, wherein the access concentrator device receives the portions of traffic.

3. The method of claim 2, further comprising:
    analyzing, by the system, the public network addresses respectively associated with the portions of traffic associated with the communication devices of the set of communication devices; and
    in response to the analyzing the public network addresses, identifying, by the system, the first portion of the traffic as being associated with the first user identity that is the user identity of interest based on the first portion of the traffic being associated with the first public network address to facilitate the capturing the first portion of traffic.

4. The method of claim 2, wherein the aggregating further comprises:
    facilitating aggregating, by the system, the first portion of the traffic at a first regional aggregation node device of the set of regional aggregation node devices; and
    facilitating aggregating, by the system, the second portion of the traffic at a second regional aggregation node device of the set of regional aggregation node devices.

5. The method of claim 2, wherein the aggregating further comprises:
    facilitating aggregating, by the system, the first portion of the traffic and the second portion of the traffic at one regional aggregation node device of the set of regional aggregation node devices.

6. The method of claim 1, further comprising:
    storing, by the system, the first portion of the traffic associated with the first communication device; and
    providing, by the system, the first portion of the traffic associated with the first communication device to a third communication device that indicated an interest in traffic associated with the first communication device.

7. The method of claim 1, further comprising:
    routing, by the system, the portions of traffic respectively associated with the set of communication devices to a regional termination node device to facilitate the capturing of the first portion of the traffic; and
    routing, by the system, the portions of traffic respectively associated with the set of communication devices to respective destinations of the portions of traffic.

8. The method of claim 1, wherein the defined capture criterion comprises information relating to the first public network address.

9. A tangible computer-readable medium storing computer-executable instructions that, in response to execution, cause a system comprising a processor to perform operations, comprising:
    assigning a first public network address to a first communication device of a set of communication devices to facilitate indicating that a first subscriber identity associated with the first communication device is a subscriber identity of interest based on first information associated with the first subscriber identity, in accordance with a defined policy relating to traffic capture;
    assigning a second public network address to a second communication device of the set of communication devices to facilitate indicating that a second subscriber identity associated with the second communication device is a subscriber identity that is not of interest based on second information associated with the second subscriber identity, in accordance with the defined policy;
    aggregating portions of traffic respectively associated with communication devices of the set of communication devices at a set of regional aggregation node devices associated with a set of regions of a communication network to facilitate analyzing the portions of traffic, wherein the portions of traffic comprise a first portion of traffic associated with the first communication device and a second portion of traffic associated with the second communication device;

analyzing the portions of traffic comprising address information indicating public network addresses respectively associated with the portions of traffic, wherein the public network addresses comprise the first public network address and the second public network address; and capturing the first portion of the traffic associated with the first communication device based on a defined capture criterion associated with the defined policy and a result of the analyzing the portions of traffic indicating the first portion of traffic is associated with the first public network address, wherein the defined capture criterion relates to capture of traffic associated with communication devices associated with subscriber identities that are subscriber identities of interest.

10. An apparatus comprising:

a memory to store instructions;

a processor, coupled to the memory, that facilitates execution of the instructions to perform operations, comprising:

assigning a first public network address to a first communication device of a set of communication devices to facilitate indicating that a first user identity associated with the first communication device is a user identity of interest based on first information associated with the first user identity, in accordance with a defined policy relating to traffic capture;

assigning a second public network address to a second communication device of the set of communication devices to facilitate indicating that a second user identity associated with the second communication device is a user identity that is not of interest based on second information associated with the second user identity, in accordance with the defined policy;

aggregating portions of traffic respectively associated with communication devices of a set of communication devices at a set of regional aggregation node devices associated with a set of regions of a communication network to facilitate analyzing the portions of traffic, wherein the portions of traffic comprise a first portion of traffic associated with the first communication device and a second portion of traffic associated with the second communication device;

analyzing the portions of traffic comprising address information indicating public network addresses respectively associated with the portions of traffic, wherein the public network addresses comprise the first public network address and the second public network address; and capturing the first portion of the traffic associated with the first communication device based on a defined capture criterion associated with the defined policy and a result of the analyzing the portions of traffic indicating the first portion of traffic is associated with the first public network address associated with the first communication device, wherein the defined capture criterion relates to capture of traffic associated with communication devices associated with user identities of interest.

11. The apparatus of claim 10, wherein the first information associated with the first user identity comprises a first authentication credential associated with the first user identity, and the second information associated with the second user identity comprises a second authentication credential associated with the second user identity.

12. The method of claim 1, further comprising:

identifying, by the system, the first user identity associated with the first communication device as the user identity of interest, based on the first information comprising a first authentication credential associated with the first user identity, to facilitate the assigning of the first public network address to the first communication device, in accordance with the policy; and identifying, by the system, the second user identity associated with the second communication device as being the user identity that is not of interest, based on the second information comprising a second authentication credential associated with the second user identity, to facilitate the assigning of the second public network address to the first communication device, in accordance with the policy.

13. The tangible computer-readable medium of claim 9, wherein the first information associated with the first subscriber identity comprises a first authentication credential associated with the first subscriber identity, and the second information associated with the second subscriber identity comprises a second authentication credential associated with the second subscriber identity, and the operations further comprise:

identifying the first subscriber identity associated with the first communication device as the subscriber identity of interest, based on the first authentication credential and the policy, to facilitate the assigning of the first public network address to the first communication device; and identifying the second subscriber identity associated with the second communication device as being the subscriber identity that is not of interest, based on the second authentication credential and the policy, to facilitate the assigning of the second public network address to the first communication device.

* * * * *